US012812542B2

(12) United States Patent
Abedini et al.

(10) Patent No.: US 12,812,542 B2
(45) Date of Patent: Nov. 24, 2026

(54) BEAMFORMING CONFIGURATION OF SYNCHRONIZATION SIGNALS

(71) Applicant: QUALCOMM Incorporated, San Diego, CA (US)

(72) Inventors: Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 18/472,088

(22) Filed: Sep. 21, 2023

(65) Prior Publication Data

US 2025/0106767 A1 Mar. 27, 2025

(51) Int. Cl.

*H04W 52/02* (2009.01)
*H04B 7/0408* (2017.01)
*H04B 7/06* (2006.01)
*H04W 56/00* (2009.01)

(52) U.S. Cl.

CPC ...... *H04W 52/0235* (2013.01); *H04B 7/0408* (2013.01); *H04B 7/0617* (2013.01); *H04W 52/0216* (2013.01); *H04W 56/001* (2013.01)

(58) Field of Classification Search

CPC ......... H04W 52/0235; H04W 52/0216; H04W 56/001; H04W 52/0229; H04B 7/0408; H04B 7/0617; H04B 7/0695; H04B 7/088
USPC .......................................................... 370/311
See application file for complete search history.

(56) References Cited

U.S. PATENT DOCUMENTS

2017/0289932 A1* 10/2017 Islam ................ H04W 74/0833
2019/0044584 A1* 2/2019 Lee ...................... H04B 7/0417
2019/0053162 A1* 2/2019 Islam ................ H04W 52/0216
2019/0053321 A1* 2/2019 Islam ................ H04W 52/0235
2019/0059129 A1* 2/2019 Luo ...................... H04B 7/0619
2020/0112919 A1* 4/2020 Nam ................. H04W 52/0229
2020/0244338 A1* 7/2020 Raghavan ............ H04B 7/0408
2020/0314755 A1* 10/2020 Sarkis ................... H04L 5/0053
2021/0127335 A1* 4/2021 Rostami ............ H04W 52/0229
2022/0030439 A1* 1/2022 Taherzadeh Boroujeni ................ H04W 76/28
2023/0199649 A1* 6/2023 Kwak ............... H04W 52/0229 370/329
2024/0349204 A1* 10/2024 Matsumura ........... H04L 5/0051

(Continued)

*Primary Examiner* — Kwang B Yao
*Assistant Examiner* — Syed M Bokhari
(74) *Attorney, Agent, or Firm* — QUALCOMM Incorporated

(57) ABSTRACT

Methods, systems, and devices for wireless communications are described. The techniques described herein relate to beamforming configurations of synchronization signal blocks to reduce power consumption at a user equipment (UE) and a network entity. The UE monitors for a first set of beamformed synchronization signals including a first subset of synchronization information. The UE transmits one or more beamformed wake-up signals (WUSs) based on the monitoring for the first set of beamformed synchronization signals. The UE monitors, in response to transmitting the one or more beamformed wake-up signals, for a second set of beamformed synchronization signals including a second subset of the synchronization information. Each beamformed synchronization signal of the first set of beamformed synchronization signals corresponds to multiple beamformed synchronization signals of the second set of beamformed synchronization signals.

30 Claims, 14 Drawing Sheets

(56) References Cited

U.S. PATENT DOCUMENTS

2025/0016739 A1 * 1/2025 Agiwal ............. H04W 52/0229

* cited by examiner

BEAMFORMING CONFIGURATION OF SYNCHRONIZATION SIGNALS

FIELD OF TECHNOLOGY

The following relates to wireless communications, including beamforming configuration of synchronization signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication systems may support a beamforming procedure between a network entity and a UE. In some examples of a beamforming procedure, the network entity may transmit multiple synchronization signal blocks (SSBs) over multiple beams towards the direction of the UE to form a directional transmission to the UE. However, such beamformed SSB communications may involve high power consumption at the UE among other potential issues.

SUMMARY

The described techniques relate to improved methods, systems, devices, and apparatuses that support beamforming configuration of synchronization signals (e.g., synchronization signal blocks (SSBs)). To balance the power consumption at a user equipment (UE) and at the network entity, as well to transmit the SSBs based on the access latency of the UE, the network entity may transmit a quantity of a first set of SSBs (e.g., using wider beams), which may be smaller than a quantity of a second set of SSBs (e.g., using narrower beams than the beams for the first set of SSBs). The first set of SSBs may carry a first subset of synchronization information and the second set of SSBs may carry a second subset of synchronization information. The beamforming configuration may involve a one-to-one mapping between the first set of SSBs and uplink wake-up signals (UL-WUSs), a one-to-many (e.g., more than one) mapping between the first set of SSBs and the second set of SSBs, and a one-to-many mapping between the UL-WUS and the second set of SSBs. That is, a single SSB of the first set of SSBs may correspond to a single UL-WUS (e.g., one-to-one mapping), a single SSB of the first set of SSBs may correspond to multiple SSBs of the second set of SSBs (e.g., one-to-many mappings), and a single UL-WUS may correspond to multiple SSBs of the second set of SSBs (e.g., one-to-many mapping). In this beamforming configuration, the UE may transmit a single UL-WUS for a single SSB of the first set of SSBs, and the UE may receive more than one SSB of the second set of SSBs in response to transmitting the single UL-WUS. In some examples, the beamforming configuration may involve a one-to-many mapping between first set of SSBs and the UL-WUSs, a one-to-many mapping between the first set of SSBs and the second set of SSBs, and a one-to many mapping between the UL-WUSs and the second set of SSBs.

A method for wireless communications by a UE is described. The method may include monitoring for a first set of beamformed synchronization signals including a first subset of synchronization information, transmitting one or more beamformed WUSs based on the monitoring for the first set of beamformed synchronization signals, and monitoring, in response to transmitting the one or more beamformed WUSs, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

A UE for wireless communications is described. The UE may include one or more memories storing processor executable code, and one or more processors coupled with the one or more memories. The one or more processors may individually or collectively operable to execute the code to cause the UE to monitor for a first set of beamformed synchronization signals including a first subset of synchronization information, transmit one or more beamformed WUSs based on the monitoring for the first set of beamformed synchronization signals, and monitor, in response to transmitting the one or more beamformed WUSs, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

Another UE for wireless communications is described. The UE may include means for monitoring for a first set of beamformed synchronization signals including a first subset of synchronization information, means for transmitting one or more beamformed WUSs based on the monitoring for the first set of beamformed synchronization signals, and means for monitoring, in response to transmitting the one or more beamformed WUSs, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

A non-transitory computer-readable medium storing code for wireless communications is described. The code may include instructions executable by a processor to monitor for a first set of beamformed synchronization signals including a first subset of synchronization information, transmit one or more beamformed WUSs based on the monitoring for the first set of beamformed synchronization signals, and monitor, in response to transmitting the one or more beamformed WUSs, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

Some examples of the method, UEs, and non-transitory computer-readable medium described herein may further include operations, features, means, or instructions for receiving control signaling that indicates, a mapping between each of the beamformed synchronization signals of the first set of beamformed synchronization signals and the set of multiple beamformed synchronization signals of the second set of beamformed synchronization signals, a mapping between each of the beamformed synchronization signals of the first set of beamformed synchronization signals and the one or more beamformed WUSs, a mapping between the one or more beamformed WUSs and the set of multiple beamformed synchronization signals of the second set of beamformed synchronization signals, and a combination thereof.

In some examples of the method, UEs, and non-transitory computer-readable medium described herein, the control signaling includes a system information (SI) signal, a radio resource control (RRC) signal, or a combination thereof.

Some examples of the method, UEs, and non-transitory computer-readable medium described herein may further include operations, features, means, or instructions for receiving control signaling that indicates a reference signal receive power (RSRP) threshold for transmitting a single beamformed WUS or a set of multiple beamformed WUSs as the one or more beamformed WUSs.

In some examples of the method, UEs, and non-transitory computer-readable medium described herein, in response to a RSRP associated with one or more beamformed synchronization signals of the first set of beamformed synchronization signals being greater than the RSRP threshold, transmitting the single beamformed WUS as the one or more beamformed WUSs and in response to the RSRP associated with one or more beamformed synchronization signals of the first set of beamformed synchronization signals being less than the RSRP threshold, transmitting the set of multiple beamformed WUSs as the one or more beamformed WUSs.

Some examples of the method, UEs, and non-transitory computer-readable medium described herein may further include operations, features, means, or instructions for transmitting the one or more beamformed WUSs may be based on a selected WUS sequence of a set of multiple WUS sequences, the selected WUS sequence based on a quantity of beamformed WUSs transmitted as the one or more beamformed WUSs.

Some examples of the method, UEs, and non-transitory computer-readable medium described herein may further include operations, features, means, or instructions for receiving control signaling that indicates additional information for the monitoring of the first set of beamformed synchronization signals, the additional information including a time window, a frequency location, one or more candidate beam directions, or any combination thereof.

In some examples of the method, UEs, and non-transitory computer-readable medium described herein, a quantity of directional beams associated with transmitting the one or more beamformed WUSs may be based on a UE capability, a RSRP associated with the first set of beamformed synchronization signals, the additional information, or any combination thereof.

In some examples of the method, UEs, and non-transitory computer-readable medium described herein, a first quantity of directional transmission beams associated with transmitting the one or more beamformed WUSs may be greater than a second quantity of directional receive beams associated with monitoring the first set of beamformed synchronization signals.

A method for wireless communications by a network entity is described. The method may include transmitting a first set of beamformed synchronization signals including a first subset of synchronization information, receiving one or more beamformed WUSs based on transmitting the first set of beamformed synchronization signals, and transmitting, in response to receiving the one or more beamformed WUSs, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

A network entity for wireless communications is described. The network entity may include one or more memories storing processor executable code, and one or more processors coupled with the one or more memories. The one or more processors may individually or collectively operable to execute the code to cause the network entity to transmit a first set of beamformed synchronization signals including a first subset of synchronization information, receive one or more beamformed WUSs based on transmitting the first set of beamformed synchronization signals, and transmit, in response to receiving the one or more beamformed WUSs, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

Another network entity for wireless communications is described. The network entity may include means for transmitting a first set of beamformed synchronization signals including a first subset of synchronization information, means for receiving one or more beamformed WUSs based on transmitting the first set of beamformed synchronization signals, and means for transmitting, in response to receiving the one or more beamformed WUSs, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

A non-transitory computer-readable medium storing code for wireless communications is described. The code may include instructions executable by a processor to transmit a first set of beamformed synchronization signals including a first subset of synchronization information, receive one or more beamformed WUSs based on transmitting the first set of beamformed synchronization signals, and transmit, in response to receiving the one or more beamformed WUSs, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

In some examples of the method, network entities, and non-transitory computer-readable medium described herein, a first beam width associated with transmitting the first set of beamformed synchronization signals may be wider than a second beam width associated with transmitting the second set of beamformed synchronization signals.

In some examples of the method, network entities, and non-transitory computer-readable medium described herein, a same one or more directional beams may be associated with transmitting the first set of beamformed synchronization signals and the second set of beamformed synchronization signals.

Some examples of the method, network entities, and non-transitory computer-readable medium described herein may further include operations, features, means, or instructions for transmitting the first set of beamformed synchronization signals or the second set of beamformed synchronization signals includes transmitting one or more repetitions of synchronization signal blocks over a single transmission beam.

In some examples of the method, network entities, and non-transitory computer-readable medium described herein, a first beam width associated with transmitting the first set of beamformed synchronization signals may be wider than a second beam width associated with receiving the one or more beamformed WUSs.

Some examples of the method, network entities, and non-transitory computer-readable medium described herein may further include operations, features, means, or instructions for transmitting control signaling that indicates, a mapping between each of the beamformed synchronization signals of the first set of beamformed synchronization signals and the set of multiple beamformed synchronization signals of the second set of beamformed synchronization signals, a mapping between each of the beamformed synchronization signals of the first set of beamformed synchronization signals and the one or more beamformed WUSs, a mapping between the one or more beamformed WUSs and the set of multiple beamformed synchronization signals of the second set of beamformed synchronization signals, and a combination thereof.

In some examples of the method, network entities, and non-transitory computer-readable medium described herein, the control signaling includes a SI signal, a RRC signal, or a combination thereof.

Some examples of the method, network entities, and non-transitory computer-readable medium described herein may further include operations, features, means, or instructions for transmitting control signaling that indicates a RSRP threshold for transmitting a single beamformed WUS or a set of multiple beamformed WUSs as the one or more beamformed WUSs.

In some examples of the method, network entities, and non-transitory computer-readable medium described herein, in response to a RSRP associated with one or more beamformed synchronization signals of the first set of beamformed synchronization signals being greater than the RSRP threshold, receiving the single beamformed WUS as the one or more beamformed WUSs and in response to the RSRP associated with one or more beamformed synchronization signals of the first set of beamformed synchronization signals being less than the RSRP threshold, receiving the set of multiple beamformed WUSs as the one or more beamformed WUSs.

Some examples of the method, network entities, and non-transitory computer-readable medium described herein may further include operations, features, means, or instructions for receiving the one or more beamformed WUSs may be based on a selected WUS sequence of a set of multiple WUS sequences, the selected WUS sequence based on a quantity of beamformed WUSs received as the one or more beamformed WUSs.

Some examples of the method, network entities, and non-transitory computer-readable medium described herein may further include operations, features, means, or instructions for transmitting control signaling that indicates additional information for a UE to monitor for the first set of beamformed synchronization signals, the additional information including a time window, a frequency location, one or more candidate beam directions, or any combination thereof.

In some examples of the method, network entities, and non-transitory computer-readable medium described herein, a quantity of directional beams associated with receiving the one or more beamformed WUSs may be based on a UE capability, a RSRP associated with the first set of beamformed synchronization signals, the additional information, or any combination thereof.

In some examples of the method, network entities, and non-transitory computer-readable medium described herein, a first quantity of directional beams associated with receiving the one or more beamformed WUSs may be greater than a second quantity of directional beams associated with transmitting the first set of beamformed synchronization signals.

DETAILED DESCRIPTION

Figure 1:
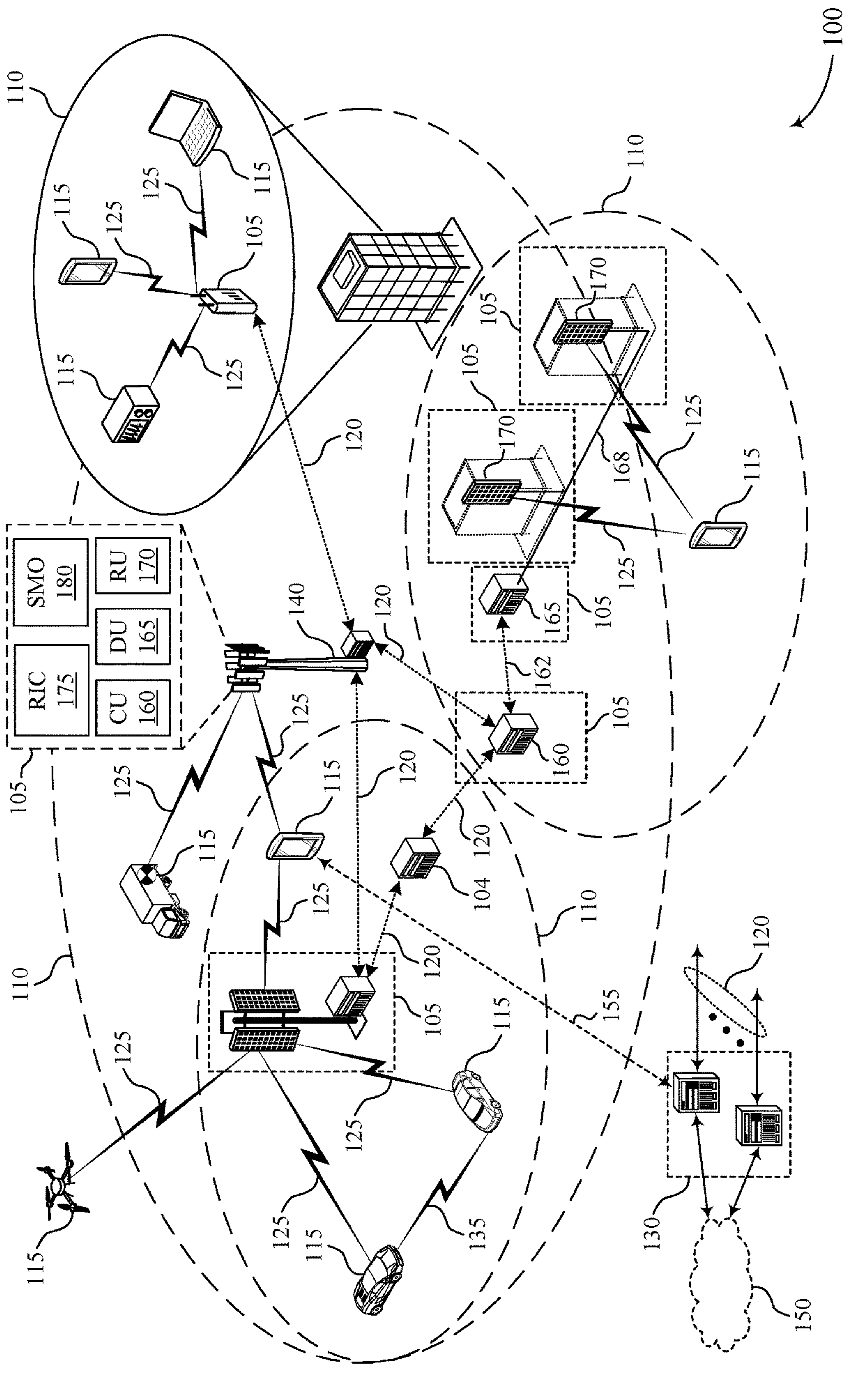
FIG. 1 shows an example of a wireless communications system that supports beamforming configuration of synchronization signals in accordance with one or more aspects of the present disclosure.

Some wireless communication systems may support a beamforming procedure between a network entity and a user equipment (UE). In some examples of a beamforming procedure, the network entity may transmit multiple synchronization signal blocks (SSBs) over multiple beams towards the direction of the UE to form a directional transmission to the UE. The network entity may transmit a set of SSBs periodically, for example, four SSBs occupying four symbols (e.g., time resources) that are transmitted every 20 milliseconds (ms) over each of the beams (e.g., 64 beam directions). To reduce power consumption at the network entity during a low traffic period, the network entity may transmit a first set of the SSBs, such as two SSBs (e.g., occupying two symbols) rather than sending the entire set of SSBs (e.g., four total SSBs), which includes the first set of SSBs and a second set of SSBs. For example, the first set of SSBs may include discovery reference signals (DRS), which are transmitted to facilitate the UE in discovering an active channel. The UE may choose to communicate with the network entity after receiving the first set of SSBs, and the UE may transmit an uplink wake-up signal (UL-WUS) to request the second set of SSBs from the network entity. The network entity may transmit the second set of SSBs to the UE after receiving the UL-WUS (e.g., transmit the other two SSBs on demand of the UE). In this manner, the first set of SSBs and the second set of SSBs are transmitted in a one-to-one mapping of the first set of SSBs and the second set of SSBs. However, such one-to-one mapping transmissions for reducing power consumption at the network entity may not take into consideration the power consumption at the UE.

To balance the power consumption at the UE and at the network entity, in addition to transmitting the SSBs based on the access latency of the UE, a quantity of the first set of SSBs (e.g., using wider beams) may be smaller than the quantity of the second set of SSBs (e.g., using narrower beams than for the first set of SSBs). For example, the beamforming configuration may involve a one-to-one mapping between the first set of SSBs (e.g., DRS) and the UL-WUS, a one-to-many (e.g., more than one) mapping between the first set of SSBs and the second set of SSBs, and a one-to-many mapping between the UL-WUS and the second set of SSBs. That is, a single SSB of the first set of SSBs may correspond to a single UL-WUS (e.g., one-to-one mapping), a single SSB of the first set of SSBs may correspond to multiple SSBs of the second set of SSBs (e.g., one-to-many mappings), and a single UL-WUS may correspond to multiple SSBs of the second set of SSBs (e.g., one-to-many mapping). In this beamforming configuration, the UE may transmit a single UL-WUS for a single SSB of the first set of SSBs, and the UE may receive more than one SSB of the second set of SSBs in response to transmitting the single UL-WUS. In some examples, the beamforming configuration may involve a one-to-many mapping between the first set of SSBs and the UL-WUS, a one-to-many mapping between the first set of SSBs and the second set of SSBs, and a one-to many mapping between the UL-WUS and the second set of SSBs.

In some examples, information about the mapping may be provided to the UE, as well as additional information related to the first set of SSBs, such as a time window, a frequency location, or candidate beam directions (e.g., to improve the search for the first set of SSBs). In some examples, the additional information may indicate a reference signal receive power (RSRP) threshold associated with the first set of SSBs for transmitting a single UL-WUS or multiple UL-WUSs for the one-to-many mapping between the first set of SSBs and one or more UL-WUSs. In some examples, the one or more UL-WUSs may be transmitted based on a selected UL-WUS sequence of multiple sequences. The selected sequence may be based on a quantity of UL-WUSs transmitted as the one or more UL-WUS. In some examples, to reduce a signal to interference plus noise ratio (SINR), the network entity may repeatedly transmit the SSBs using the same transmit beam and the UE may combine the SSBs at a single or multiple receive beams. The one-to-many mappings technique may reduce power consumption at the network entity and/or at the UE, as well as facilitate stronger beamforming and increased link budget.

Aspects of the disclosure are initially described in the context of wireless communications systems. Aspects of the disclosure are further illustrated by and described with reference to apparatus diagrams, system diagrams, and flowcharts that relate to beamforming configuration of synchronization signals, such as SSBs.

FIG. 1 shows an example of a wireless communications system 100 that supports beamforming configuration of synchronization signals, such as SSBs, in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support beamforming configuration of synchronization signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information (SI) signals), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 125 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Additionally, some wireless communication systems 100 may support a beamforming procedure between a network entity 105 and a UE 115. In some examples of the beamforming procedure, the network entity 105 may transmit multiple SSBs over multiple beams towards the direction of the UE 115 to form a directional transmission to the UE 115. To reduce power consumption at the network entity 105 during a low traffic period, the network entity 105 may transmit a first set of the SSBs, such as two SSBs rather than sending the entire set of SSBs, such as four SSBs, which includes the first set of SSBs and a second set of SSBs. The UE 115 may choose to communicate with the network entity 105 after receiving the first set of SSBs, and the UE 115 may transmit an UL-WUS to request the second set of SSBs from the network entity 105. The network entity 105 may transmit the second set of SSBs to the UE 115 after receiving the UL-WUS. In this manner, the first set of SSBs and the second set of SSBs are transmitted in a one-to-one mapping of the first set of SSBs and the second set of SSBs. However, such one-to-one mapping transmissions for reducing power consumption at the network entity 105 may not take into consideration the power consumption at the UE 115.

To balance the power consumption at the UE 115 and at the network entity 105, in addition to transmitting the SSBs based on the access latency of the UE 115, the network entity 105 may transmit a quantity of the first set of SSBs, which may be smaller than the quantity of the second set of SSBs. For example, the beamforming configuration may involve a one-to-one mapping between the first set of SSBs and the UL-WUSs, a one-to-many mapping between the first set of SSBs and the second set of SSBs, and a one-to-many mapping between the UL-WUSs and the second set of SSBs. That is, a single SSB of the first set of SSBs may correspond to a single UL-WUS (e.g., one-to-one mapping), a single SSB of the first set of SSBs may correspond to multiple SSBs of the second set of SSBs (e.g., one-to-many mappings), and a single UL-WUS may correspond to multiple SSBs of the second set of SSBs (e.g., one-to-many mapping). In some examples, the beamforming configuration may involve a one-to-many mapping between first set of SSBs and the UL-WUS, a one-to-many mapping between the first set of SSBs and the second set of SSBs, and a one-to many mapping between the UL-WUS and the second set of SSBs.

Moreover, in some examples, information about the mapping may be provided to the UE 115, as well as additional information related to the first set of SSBs, such as a time window, a frequency location, or candidate beam directions (e.g., to improve the search for the first set of SSBs). In some examples, the information may indicate an RSRP threshold associated with the first set of SSBs for transmitting a single UL-WUS or multiple UL-WUS for the one-to-many mapping between the first set of SSBs and the one or more UL-WUSs. In some examples, the one or more UL-WUS may be transmitted based on a selected UL-WUS sequence of multiple sequences. The selected sequence may be based on a quantity of UL-WUSs transmitted as the one or more UL-WUS. In some examples, to reduce a SINR, the network entity 105 may repeatedly transmit the SSBs using the same transmit beam and the UE 115 may combine the SSBs at a single or multiple receive beams. The one-to-many mappings technique may reduce power consumption at the network entity 105 and/or at the UE 115, as well as facilitate stronger beamforming and increased link budget.

Figure 2:
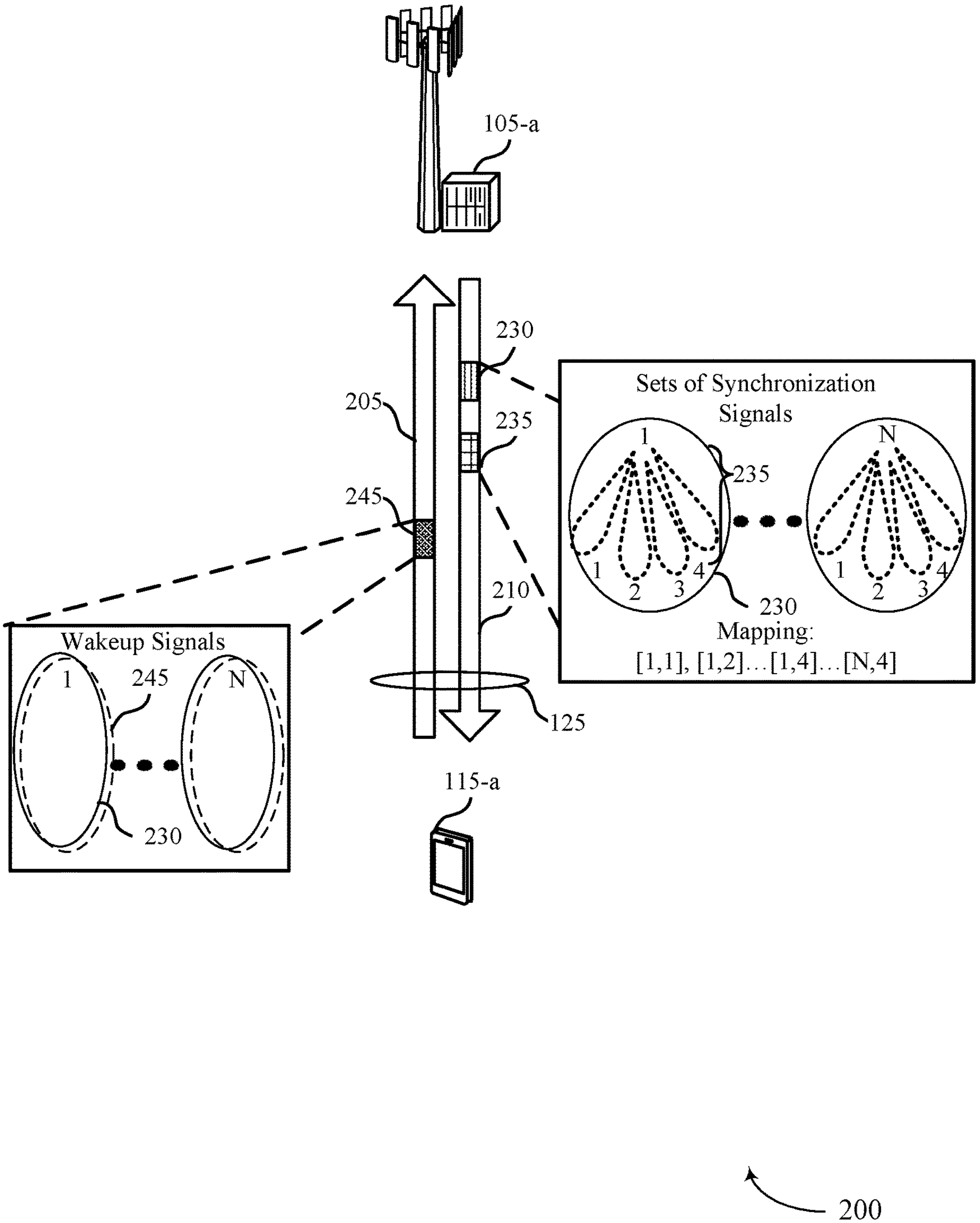
FIG. 2 shows an example of a wireless communications system that supports beamforming configuration of synchronization signals blocks in accordance with one or more aspects of the present disclosure.

FIG. 2 shows an example of a wireless communications system 200 that supports beamforming configuration of synchronization signals in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 described with respect to FIG. 1. The wireless communications system 200 also includes a network entity 105-*a*, which may be an example of a network entity 105 as described with respect to FIG. 1.

The network entity 105-*a* may communicate with the UE 115-*a* using a communication link 125. The communication link 125 may be an example of an NR or LTE link between the UE 115-*a* and the network entity 105-*a*. The communication link 125 may include a bi-directional link that enables both uplink and downlink communications. For example, the UE 115-*a* may transmit uplink signals 205 (e.g., uplink transmissions), such as uplink control signals or uplink data signals, to the network entity 105-*a* using the communication link 125 and the network entity 105-*a* may transmit downlink signals 210 (e.g., downlink transmissions), such as downlink control signals or downlink data signals, to the UE 115-*a* using the communication link 125.

In some examples, the wireless communications system 200 may involve low-load or idle traffic conditions at the network entity 105-*a*, the UE 115-*a*, or between the network entity 105-*a* and the UE 115-*a*. To provide power saving at the network entity 105-*a*, transmission of signals that are often broadcasted or periodically transmitted, such as synchronization signals (e.g., SSBs), SI signals, RACH signals, paging signals, or other signals that significantly contribute to power consumption at the network entity 105, may be adjusted. For example, the network entity 105-*a* may transmit the signals on-demand, such that the signals are transmitted based on a demand (e.g., request) from the UE 115-*a*. For example, the network entity 105-*a* may transmit a first set of SSBs (e.g., synchronization signals, DRS signals, or "light-SSB" that contain a first subset of synchronization information), as discussed herein. In some examples, the network entity 105-*a* may transmit on-demand remaining material system information (RMSI) or on-demand SSBs (e.g., SSBs that contain a second subset of the synchronization information) based on a demand from the UE 115-*a*.

In some examples, a cell of the wireless communications system 200 in a network energy saving (NES) mode may support a configuration that includes a first quantity of the first set of SSBs (e.g., DRS or synchronization signals), N1, that have a first periodicity, P1. The network entity 105-*a* may monitor for a second quantity of UL-WUS during a second occasion, N2, that have a second periodicity, P2. Upon detection of the UL-WUS on a respective occasion, the network entity 105-*a* may transmit a second set of SSBs (e.g., or RMSI) during a third occasion, O3, within a period, for a quantity of K3 periods, with a third periodicity, P3.

In some examples, the network entity 105-*a* may monitor for a RACH during a fourth occasion, O4, within a period, for a quantity of K4 periods, with a fourth periodicity, P4. In some examples, the first quantity of SSBs, N1, and the second quantity of UL-WUS during the second occasion, N2, may be equal, the second quantity of the UL-WUS may be equal to the third quantity of SSBs, N3, and the quantity of the first set of SSBs, the UL-WUSs, and the second set of SSBs may be the same (e.g., N1=N2 and O3=1). That is, a one-to-one mapping may exist between the first set of SSBs, the UL-WUSs, and second set of SSBs, where the first periodicity is equal to the second periodicity, which is equal to or less than the third periodicity, and the quantity of the periods for the second set of SSBs is between one and four (e.g., P1=P2≤P3, and K3=[1, . . . , 4]).

To balance the power consumption at the network entity 105-*a* and the UE 115-*a* along with access latency associated with the UE 115-*a*, a fewer quantity of the first set of SSBs may be transmitted to the UE 115-*a* than the second set of SSBs. In some examples, the first set of SSBs may be associated with wider transmitting beams than for the second set of SSBs. In some examples, the beamforming configuration may involve a one-to-one mapping between the first set of SSBs and the UL-WUS, a one-to-many (e.g., more than one) mapping between the first set of SSBs and the second set of SSBs, and a one-to-many mapping between the UL-WUS and the second set of SSBs.

In particular, as shown in the wireless communications system 200, the network entity 105-*a* may transmit a first set of beamformed synchronization signals 230, which may include a first set of SSBs or synchronization signals. The first set of beamformed synchronization signals 230 may include a first set of synchronization information.

The UE 115-*a* may transmit one or more beamformed wake-up signals 245 based on monitoring for the first set of beamformed synchronization signals 230. Although FIG. 2 depicts a one-to-one mapping between the first set of beamformed synchronization signals 230 and the beamformed wake-up signals 245 (e.g., a single beamformed synchronization signal of the first set of beamformed synchronization signals 230 mapping to a single beamformed wake-up signal 245), a one-to-many mapping may exist between the first set of beamformed synchronization signals 230 and the beamformed wake-up signals 245 (e.g., greater than one, such as two beamformed wake-up signals 245 may map to each of the first set of beamformed synchronization signals 230). Additionally, a one-to-many mapping may exist between each of the beamformed wake-up signals 245 and the second set of beamformed synchronization signals 235 (e.g., two beamformed synchronization signals of the second set of beamformed synchronization signals 235 may map to a single beamformed wake-up signal 245).

The network entity 105-*a* may transmit the second set of beamformed synchronization signals 235, which may include a second set of SSBs or other synchronization signals. The second set of beamformed synchronization signals 235 may include a second subset of the synchronization information, such that the first subset and second subset of the synchronization information includes the entire synchronization information. A one-to-many mapping may exist between the first set of beamformed synchronization signals 230 and the second set of beamformed synchronization signals 235. For example, each of the first set of beamformed synchronization signals 230 may correspond to four synchronization signals of the second set of beamformed synchronization signals 235, in up to N sets, where N is a quantity of one or more (e.g., mapping of [1,1], [1,2] . . . [1,4] . . . [N,4]). The second set of beamformed synchronization signals 235 may be transmitted in narrower beams than the beams used to transmit the first set of beamformed synchronization signals 230.

In such a beamforming configuration, the UE 115-*a* may monitor or search for the first set of beamformed synchronization signals 230 and the second set of beamformed synchronization signals 235. The monitoring may be assisted, for example, for a connected UE 115-*a*, an idle UE 115-*a*, or an inactive UE 115-*a*, that may already have acquired the additional information. For example, the UE 115-*a* may receive the additional information via an SI signal, such as via a SI block (SIB) (e.g., SIB2, SIB3, or SIB4) or a dedicated RRC signaling. The additional information may include time windows, frequency locations, spatial resources (i.e., candidate beam directions), or other information that may assist the UE 115 in monitoring for the particular synchronization signals (e.g., first set of beamformed synchronization signals 230 or the second set of beamformed synchronization signals 235). Upon detection of a beamformed synchronization signal of the first set of beamformed synchronization signals 230 (e.g., a first SSB (SSB #1)), the UE 115-*a* may send a beamformed wake-up signal 245 (e.g., UL-WUS) on the associated occasion (e.g., time and/or frequency resource occasion). After transmitting the beamformed wake-up signal 245, the UE 115-*a* may monitor for one or more beamformed synchronization signals of the second set of beamformed synchronization signals 235. The monitoring for the one or more beamformed synchronization signals of the second set of beamformed synchronization signals 235 may also be assisted, such that the UE 115-*a* may have received an indication of the associated search window prior to monitoring.

In some examples, the UE 115-*a* may not have prior knowledge about the mapping, such as knowledge about the one-to-many mapping between the first set of beamformed synchronization signals 230 and the second set of beamformed synchronization signals 235 (e.g., each beamformed synchronization signal of the first set of beamformed synchronization signals 230 corresponds to one or more beamformed synchronization signals of the second set of beamformed synchronization signals 235). Accordingly, the UE 115-*a* may monitor for beamformed synchronization signals (e.g., blindly monitor or without knowledge), and may select the highest performing beamformed synchronization signal or the "best" signal (e.g., signal having greatest signal strength, SINR, or the like) for the follow-up communications (e.g., remaining minimum system information (RMSI) reception signaling (RX), RACH message transmission signaling (RACH MSG1 TX), and the like).

In some examples, information regarding the mapping between the first set of beamformed synchronization signals 230, the beamformed wake-up signals 245 and/or the second set of beamformed synchronization signals 235, may be provided to the UE 115-*a* (e.g., via prior SI signaling or RRC signaling). The information may indicate the third occasion, O3, which includes the quantity of the beamformed synchronization signals of the second set of beamformed synchronization signals 235 associated with or having a quasi-colocation (QCL) with each of the synchronization signals of the first set of beamformed synchronization signals 230 or each of the beamformed wake-up signals 245 (e.g., O3=four as discussed herein, but may be a quantity greater than one).

This mapping information may improve the searching technique of the UE 115-*a* used to search or monitor for the beamformed synchronization signals. For example, the UE 115-*a* may be aware of the quantity of synchronization signal candidates to be monitored before selecting the best synchronization signal (e.g., monitor for four beamformed synchronization signals of the second set of beamformed synchronization signals before selecting the synchronization signal having the greatest signal strength). In another example, the UE 115-*a* may detect multiple different beamformed synchronization signals of the first set of beamformed synchronization signals 230, for example, using different receive beams of the UE 115-*a*, and the UE 115-*a* may send one or more wake-up signals 245. When monitoring for beamformed synchronization signals of the second set of beamformed synchronization signals 235, the UE 115-*a* may monitor for each associated beamformed synchronization signals of the second set of beamformed synchronization signals 235. The UE 115-*a* having knowledge about the mappings may facilitate the UE 115-*a* in efficiently determine when to use a receive beam for monitoring additional beamformed synchronization signals of the second set of beamformed synchronization signals 235. In another example, some of the beamformed synchronization signals may be repeated, for example, transmitted by the network entity 105-*a* using the same transmit beam. The UE 115-*a* may combine or check multiple receive beams (e.g., P3 beam refinement) based on the repeated beamformed synchronization signals. The UE 115-*a* may receive signaling indicating a beamforming configuration to combine or check the multiple receive beams for the repeated beamformed synchronization signals.

In some examples, the beamforming configuration may involve a one-to-many (e.g., more than one) mapping between the first set of beamformed synchronization signals 230 and the wake-up signals 245, the first set of beamformed synchronization signals 230 and the second set of beamformed synchronization signals 235, as well as the wake-up signals 245 and the second set of beamformed synchronization signals 235. In such beamforming configurations, the UE 115-*a* may search or monitor for the first set of beamformed synchronization signals 230. The monitoring may be assisted, as discussed herein with respect to the one-to-one mappings. For example, the UE 115-*a* may receive the additional information (for connected UEs 115-*a* or inactive UEs 115-*a* that already received the information via SI signaling (e.g., SIB1-SIB4). The additional information may include time windows, frequency locations, or spatial resources (i.e., candidate beam directions). The UE 115-*a* may also receive a beamforming configuration indicating a one-to-many mapping between the first set of beamformed synchronization signals 230 and the beamformed wake-up signals 245. Upon detection of a beamformed synchronization signal of the first set of beamformed synchronization signals 230 (e.g., a first SSB (SSB #1)), the UE 15-*a* may send one or multiple wake-up signals 245 during the associated monitoring occasions.

In some examples, the network entity 105-*a* may use different receive beams for monitoring the wake-up signals 245, for example, relatively wider receive beams than the beams used for transmitting the beamformed synchronization signals of the first set of beamformed synchronization signals 230. In such examples, the UE 115-*a* may send multiple beamformed wake-up signals 245 (e.g., two or more) uplink signals to facilitate beam refinement at the network entity 105. For example, the UE 115-*a* may send multiple wake-up signals 245 based on a measurement of multiple beamformed synchronization signals of the first set of beamformed synchronization signals 230. For example, if the UE 115-*a* detects a beamformed synchronization signal of the first set of beamformed synchronization signals 230 (e.g., a first SSB (SSB #1) and a second SSB (SSB #2)), the UE 115-*a* may send a wake-up signal 245 during occasion [1,2] or [2,1], assuming a sequential and hierarchical mapping between codebooks are used for transmitting the first set of beamformed synchronization signals 230 and for monitoring the beamformed wake-up signals 245. In such examples, the UE 115-*a* may receive the additional information that may assist the UE 115-*a*. For example, the additional information received at the UE 115-*a* may indicate a mapping between the first set of beamformed synchronization signals 230 and the wake-up signal occasions for the beamformed wake-up signals 245. This mapping and selection of the occasions for the wake-up signals 245 may further depend on one or more RSRP thresholds of the first set of beamformed synchronization signals 230.

In some examples, the network entity 105-*a* may use the same receive beams for monitoring a beamformed wake-up signal 245 associated with a beam that was used to send a beamformed synchronization signal of the first set of beamformed synchronization signals 230. The network entity 105-*a* may combine the beamformed wake-up signals 245 received over the receive beams (e.g., received signal combining (RX combining)) to improve likelihood of successful detection of the beamformed wake-up signals 245.

As an example, the UE 115-*a* may transmit two beamformed wake-up signals 245 (e.g., based on a mapping or beamforming configuration) to allow the RX combining at the network entity 105-*a*. Based on signal power measurements (e.g., RSRP) of the first set of beamformed synchronization signals 230, the UE 115-*a* may transmit one beamformed wake-up signal 245 instead of the two beamformed wake-up signals 245. In particular, the UE 115-*a* may transmit one beamformed wake-up signal 245 based on a signal strength measurement even when the mapping or beamforming configuration indicates a one-to-many mapping between the first set of beamformed synchronization signals 230 and the wake-up signals 245 (e.g., fewer than N2/N1 beamformed wake-up signals 245). If the UE 115-*a* measures a strong signal strength of the first set of beamformed synchronization signals 230, such that the signal strength is above the threshold, then the UE 115-*a* may transmit one beamformed wake-up signal 245 instead of two beamformed wake-up signals 245. However, if the measured signal strength is weak, such that the signal strength is below the threshold, then the UE 115-*a* may transmit multiple beamformed wake-up signals 245 (e.g., two beamformed wake-up signals 245). The UE 115-*a* may receive signaling indicating the one or more signal strength thresholds associated with transmitting a quantity of beamformed wake-up signals 245. If fewer beamformed wake-up signals 245 are to be transmitted, such as based on the threshold, options for wake-up signal occasions associated with transmitting the wake-up signals 245, may be limited. For example, if one beamformed wake-up signal 245 is to be transmitted, the UE 115-*a* may select the occasion for a first beamformed wake-up signal 245 of the group of beamformed wake-up signals 245 associated with the first set of beamformed synchronization signals 230. Selecting the first occasion of the first beamformed wake-up signal 245 may also provide efficient processing at the network entity 105-*a*.

For example, the network entity 105-*a* may use same receive beam for monitoring the beamformed wake-up signals 245 that is associated with the beam for transmitting the first set of beamformed synchronization signals 230. The beam refinement procedure may also apply to the UE 115-*a* (e.g., P3 beam refinement). For example, the UE 115-*a* may send multiple beamformed wake-up signals 245 via multiple transmit beams, which may be narrower than the receive beam used to detect an associated synchronization signal of the first set of beamformed synchronization signals 230. In such examples, the UE 115-*a* may determine the quantity of beamformed wake-up signals 245 to transmit (e.g., using different transmit beams) based on a capability of the UE 115-*a* (e.g., a codebook configuration of the UE 115-*a*), measured signal strength of the first set of beamformed synchronization signals, additional information provided by the network entity 105-*a*, or a combination thereof. In these examples, multiple occasions for multiple beamformed wake-up signals 245 are associated with one synchronization signal of the first set of beamformed synchronization signals 230. However, the UE 115-*a* may select fewer occasions than the multiple occasions for transmitting the beamformed wake-up signals 245. A selection of a wake-up signal sequence for transmitting the beamformed wake-up signals 245 may be based on a quantity of the transmitted beamformed wake-up signals 245. The wake-up signal sequency may include an identifier (ID), such as a scrambling ID.

After transmitting the one or more beamformed wake-up signals 245, the UE 115-*a* may monitor for the second set of beamformed synchronization signals 235. In some examples, the monitoring for the second set of beamformed synchronization signals 235 may be assisted, such that the UE 115-*a* has prior knowledge of the search or monitoring window. The mapping between the occasions of the second set of beamformed synchronization signals 235 (or the quantity of associated occasions) and the beamformed wake-up signals 245, the mapping between the occasions of the second set of beamformed synchronization signals 235 and the first set of beamformed synchronization signals 230, QCL or repetition relationships, or any combination thereof, may be provided to the UE 115-*a* to improve techniques for monitoring synchronization signals.

Figure 3:
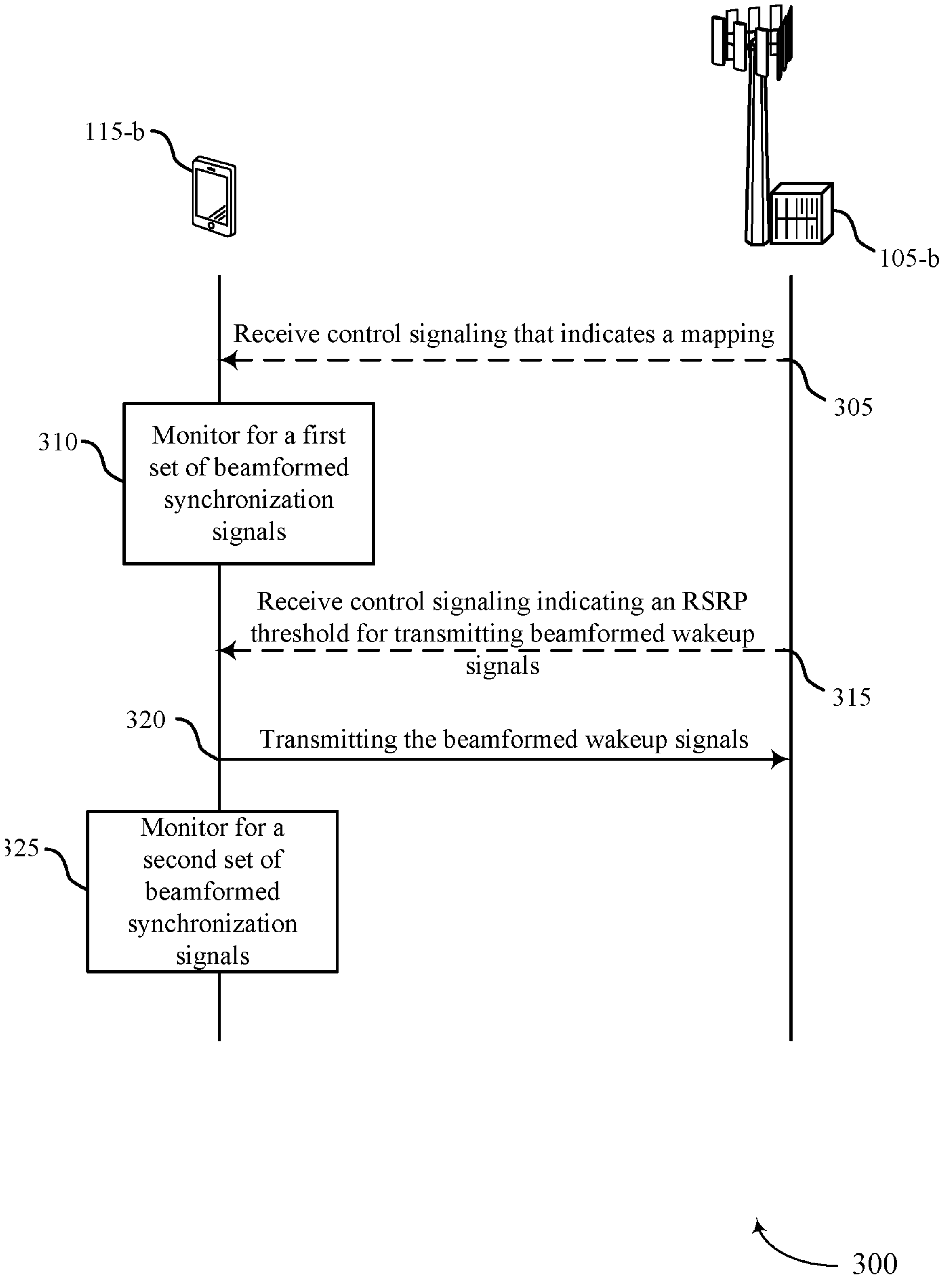
FIG. 3 shows an example of a process flow that supports beamforming configuration of synchronization signals blocks in accordance with one or more aspects of the present disclosure.

FIG. 3 shows an example of a process flow 300 that supports beamforming configuration of synchronization signals in accordance with one or more aspects of the present disclosure. The process flow 300 may implement aspects of or may be implemented by aspects of the wireless communications system 100 or the wireless communications system 200. For example, the process flow 300 may include a UE 115-*b*, which may be an example of a UE 115 as described herein. The process flow 300 may include a network entity 105-*b*, which may be an example of a network entity 105 as described herein. In the following description of the process flow 300, the operations performed by the network entity 105-*b* and the UE 115-*b* may be performed in different orders or at different times than the exemplary order shown. Some operations may also be omitted from the process flow 300, or other operations may be added to the process flow 300. Further, while operations in the process flow 300 are illustrated as being performed by the network entity 105-*b* and the UE 115-*b*, the examples herein are not to be construed as limiting, as the described features may be associated with any quantity of different devices.

In some examples, at 305, the UE 115-*b* may receive control signaling that indicates a mapping. The mapping may indicate correspondence between each of the beamformed synchronization signals of a first set of beamformed synchronization signals and the multiple beamformed synchronization signals of a second set of beamformed synchronization signals (e.g., a one-to-many mapping). The mapping may indicate correspondence between each of the beamformed synchronization signals of the first set of beamformed synchronization signals and the one or more beamformed wake-up signals (e.g., either a one-to-one mapping or a one-to-many mapping). The mapping may indicate correspondence between the one or more beamformed wake-up signals and the multiple beamformed synchronization signals of the second set of beamformed synchronization signals (e.g., a one-to-many mapping). In some examples, the control signaling may include an SI signal, an RRC signal, or both.

At 310, the UE 115-*b* may monitor for the first set of beamformed synchronization signals. The first set of beamformed synchronization signals may include a first subset of synchronization information. Also, at 315, the UE 115-*b* may receive control signaling that indicates an RSRP threshold for transmitting a single beamformed wake-up signal or multiple beamformed wake-up signals as the one or more beamformed wake-up signals. At 320, the UE 115-*b* may transmit the one or more beamformed wake-up signals based on monitoring the first set of beamformed synchronization signals. In examples where the UE 115-*b* receives the control signaling indicating the RSRP thresholds, the UE 115-*b* may also transmit the beamformed wake-up based on the indicated RSRP thresholds. Also, in some examples, in response to an RSRP associated with one or more beamformed synchronization signals of the first set of beamformed synchronization signals being greater than the RSRP threshold, the UE 115-*b* may transmit the single beamformed wake-up signal as the one or more beamformed wake-up signals. In response to the RSRP associated with one or more beamformed synchronization signals of the first set of beamformed synchronization signals being less than the RSRP threshold, the UE 115-*b* may transmit the multiple beamformed wake-up signals as the one or more beamformed wake-up signals. In some examples, transmitting the one or more beamformed wake-up signals is based on a selected wake-up signal sequence of multiple wake-up signal sequences. The selected wake-up signal sequence may be based on a quantity of beamformed wake-up signals transmitted as the one or more beamformed wake-up signals.

At 325, the UE 115-*b* may monitor, in response to transmitting the one or more beamformed wake-up signals, for a second set of beamformed synchronization signals. The second set of beamformed synchronization signals may include a second subset of the synchronization information. Each beamformed synchronization signal of the first set of beamformed synchronization signals may correspond to multiple beamformed synchronization signals of the second set of beamformed synchronization signals.

In some examples, the UE 115-*b* may receive control signaling that indicates additional information for the monitoring of the first set of beamformed synchronization signals. The additional information may include a time window, a frequency location, one or more candidate beam directions, or any combination thereof. In some examples, a quantity of directional beams associated with transmitting the one or more beamformed wake-up signals may be based on a UE capability, an RSRP associated with the first set of beamformed synchronization signals, the additional information, or any combination thereof. Additionally, in some examples, a first quantity of directional transmit beams associated with transmitting the one or more beamformed wake-up signals may be greater than a second quantity of directional receive beams associated with monitoring the first set of beamformed synchronization signals.

Figure 4:
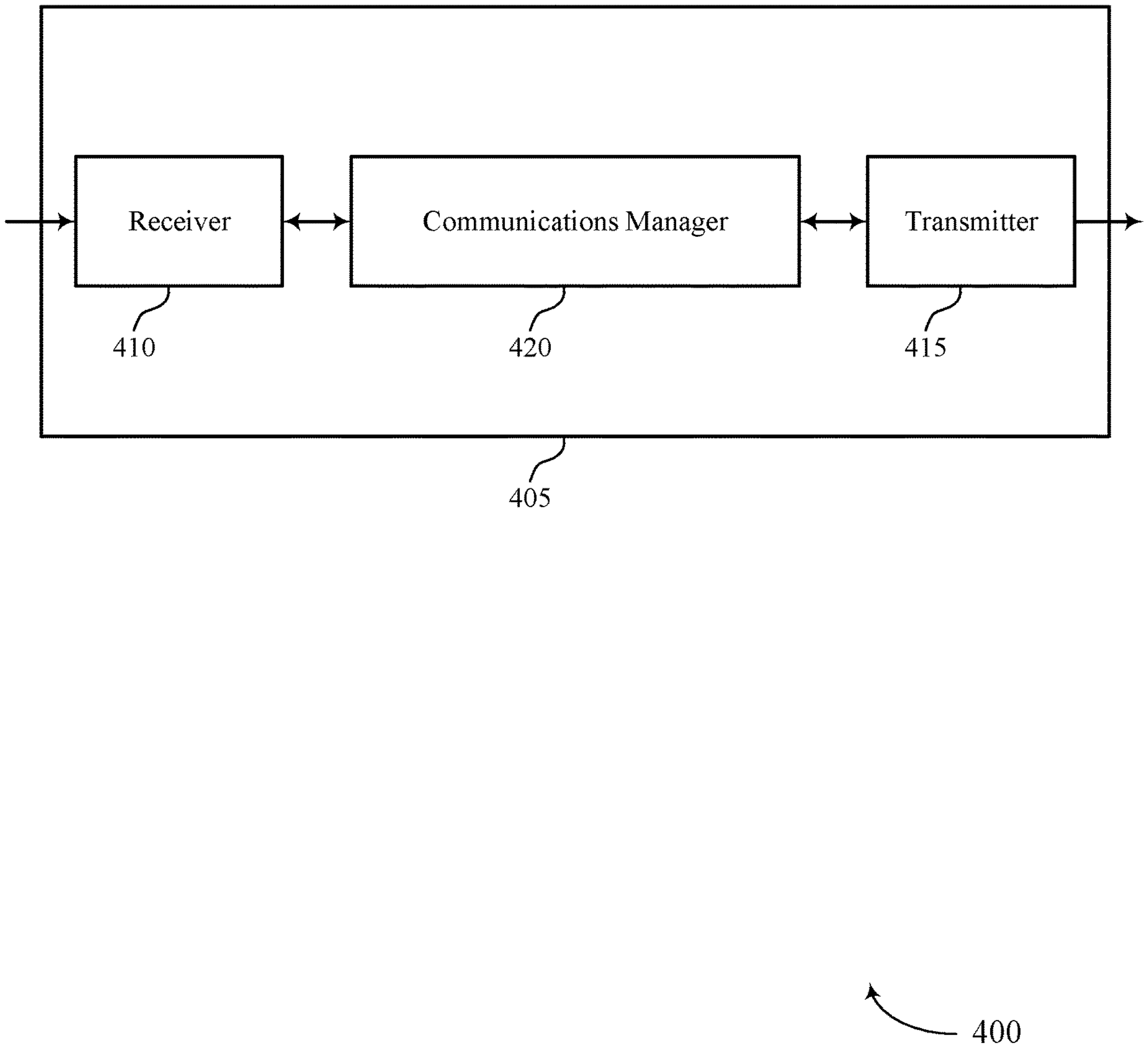
FIGS. 4 and 5 show block diagrams of devices that support beamforming configuration of synchronization signals in accordance with one or more aspects of the present disclosure.

FIG. 4 shows a block diagram 400 of a device 405 that supports beamforming configuration of synchronization signals in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to beamforming configuration of synchronization signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to beamforming configuration of synchronization signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of beamforming configuration of synchronization signals as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for monitoring for a first set of beamformed synchronization signals including a first subset of synchronization information. The communications manager 420 is capable of, configured to, or operable to support a means for transmitting one or more beamformed wake-up signals based on the monitoring for the first set of beamformed synchronization signals. The communications manager 420 is capable of, configured to, or operable to support a means for monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reducing and/or balancing power consumption at the UE 115 and the network entity 105, as well as facilitate stronger beamforming and increased link budget.

Figure 5:
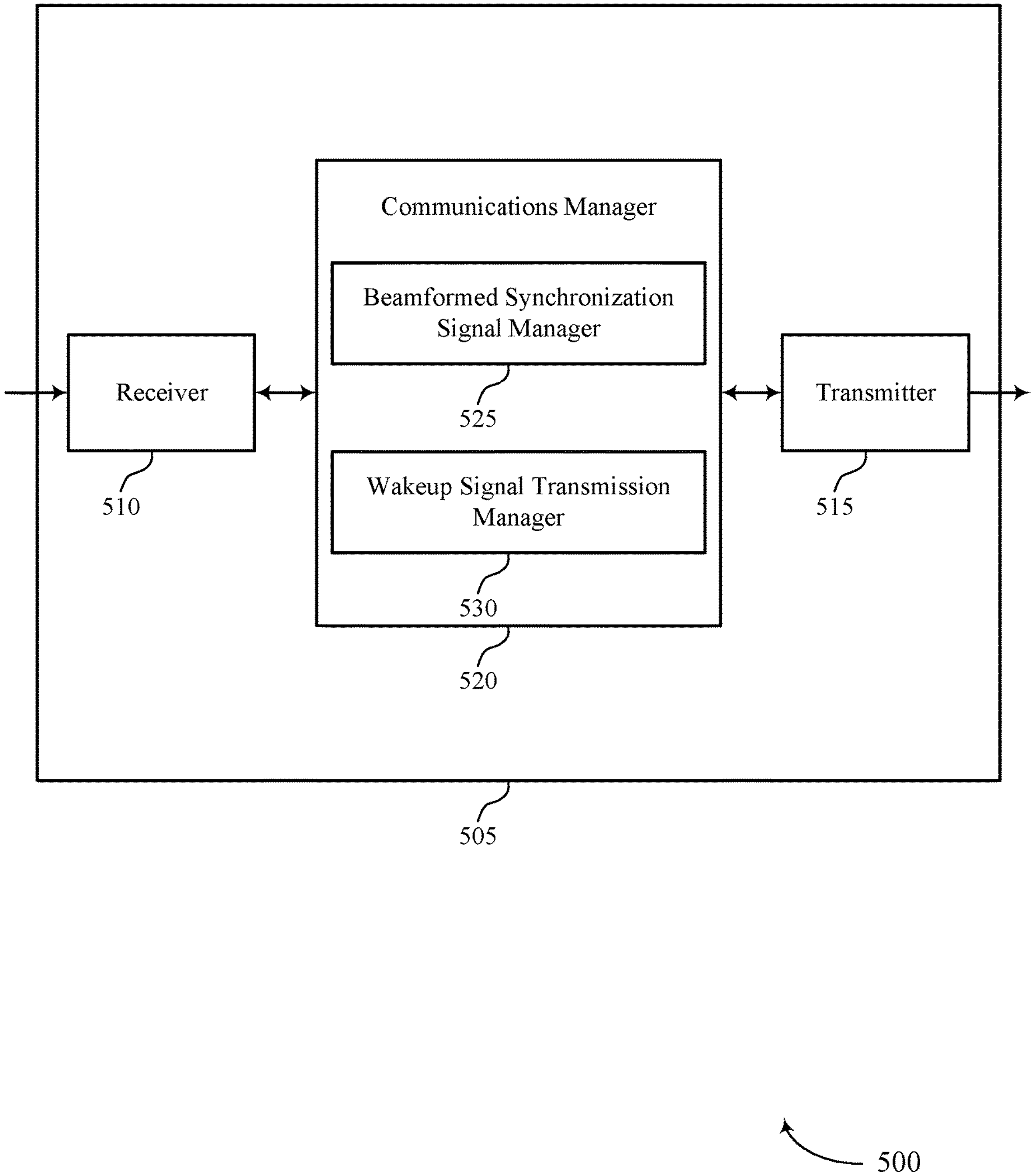

FIG. 5 shows a block diagram 500 of a device 505 that supports beamforming configuration of synchronization signals in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to beamforming configuration of synchronization signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beamforming configuration of synchronization signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of beamforming configuration of synchronization signals as described herein. For example, the communications manager 520 may include a beamformed synchronization signal manager 525 a wake-up signal transmission manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The beamformed synchronization signal manager 525 is capable of, configured to, or operable to support a means for monitoring for a first set of beamformed synchronization signals including a first subset of synchronization information. The wake-up signal transmission manager 530 is capable of, configured to, or operable to support a means for transmitting one or more beamformed wake-up signals based on the monitoring for the first set of beamformed synchronization signals. The beamformed synchronization signal manager 525 is capable of, configured to, or operable to support a means for monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

Figure 6:
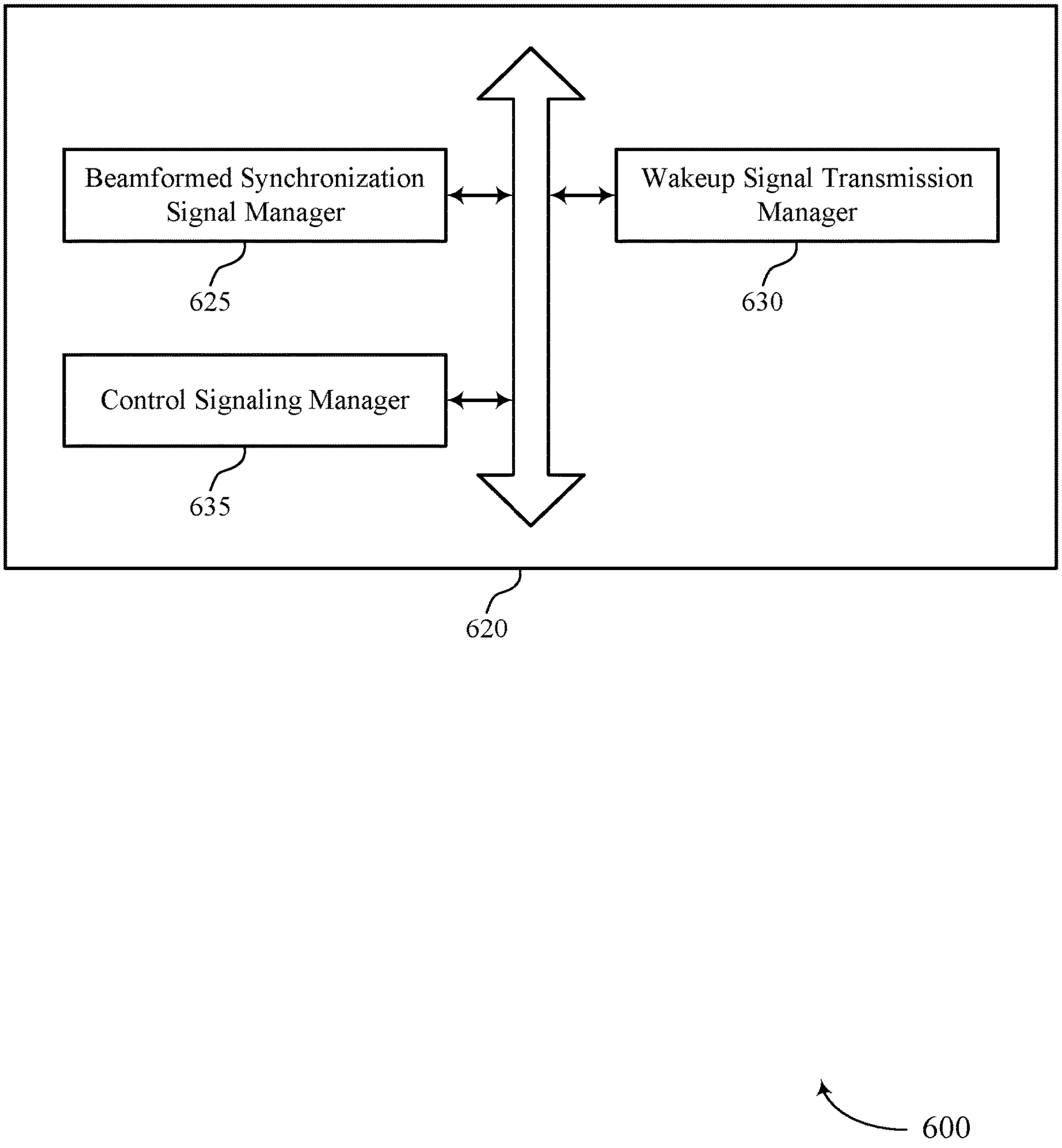
FIG. 6 shows a block diagram of a communications manager that supports beamforming configuration of synchronization signals in accordance with one or more aspects of the present disclosure.

FIG. 6 shows a block diagram 600 of a communications manager 620 that supports beamforming configuration of synchronization signals in accordance with one or more aspects of the present disclosure. The communications manager 620 may be an example of aspects of a communications manager 420, a communications manager 520, or both, as described herein. The communications manager 620, or various components thereof, may be an example of means for performing various aspects of beamforming configuration of synchronization signals as described herein. For example, the communications manager 620 may include a beamformed synchronization signal manager 625, a wake-up signal transmission manager 630, a control signaling manager 635, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The beamformed synchronization signal manager 625 is capable of, configured to, or operable to support a means for monitoring for a first set of beamformed synchronization signals including a first subset of synchronization information. The wake-up signal transmission manager 630 is capable of, configured to, or operable to support a means for transmitting one or more beamformed wake-up signals based on the monitoring for the first set of beamformed synchronization signals. In some examples, the beamformed synchronization signal manager 625 is capable of, configured to, or operable to support a means for monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

In some examples, the control signaling manager 635 is capable of, configured to, or operable to support a means for receiving control signaling that indicates. In some examples, the beamformed synchronization signal manager 625 is capable of, configured to, or operable to support a means for a mapping between each of the beamformed synchronization signals of the first set of beamformed synchronization signals and the set of multiple beamformed synchronization signals of the second set of beamformed synchronization signals. In some examples, the beamformed synchronization signal manager 625 is capable of, configured to, or operable to support a means for a mapping between each of the beamformed synchronization signals of the first set of beamformed synchronization signals and the one or more beamformed wake-up signals. In some examples, the beamformed synchronization signal manager 625 is capable of, configured to, or operable to support a means for a mapping between the one or more beamformed wake-up signals and the set of multiple beamformed synchronization signals of the second set of beamformed synchronization signals. In some examples, the beamformed synchronization signal manager 625 is capable of, configured to, or operable to support a means for a combination thereof.

In some examples, the control signaling includes a SI signal, an RRC signal, or a combination thereof.

In some examples, the control signaling manager 635 is capable of, configured to, or operable to support a means for receiving control signaling that indicates an RSRP threshold for transmitting a single beamformed wake-up signal or a set of multiple beamformed wake-up signals as the one or more beamformed wake-up signals.

In some examples, the wake-up signal transmission manager 630 is capable of, configured to, or operable to support a means for in response to an RSRP associated with one or more beamformed synchronization signals of the first set of beamformed synchronization signals being greater than the RSRP threshold, transmitting the single beamformed wake-up signal as the one or more beamformed wake-up signals. In some examples, the wake-up signal transmission manager 630 is capable of, configured to, or operable to support a means for in response to the RSRP associated with one or more beamformed synchronization signals of the first set of beamformed synchronization signals being less than the RSRP threshold, transmitting the set of multiple beamformed wake-up signals as the one or more beamformed wake-up signals.

In some examples, transmitting the one or more beamformed wake-up signals is based on a selected wake-up signal sequence of a set of multiple wake-up signal sequences, the selected wake-up signal sequence based on a quantity of beamformed wake-up signals transmitted as the one or more beamformed wake-up signals.

In some examples, the control signaling manager 635 is capable of, configured to, or operable to support a means for receiving control signaling that indicates additional information for the monitoring of the first set of beamformed synchronization signals, the additional information including a time window, a frequency location, one or more candidate beam directions, or any combination thereof.

In some examples, a quantity of directional beams associated with transmitting the one or more beamformed wake-up signals is based on a UE capability, an RSRP associated with the first set of beamformed synchronization signals, the additional information, or any combination thereof.

In some examples, a first quantity of directional transmit beams associated with transmitting the one or more beamformed wake-up signals is greater than a second quantity of directional receive beams associated with monitoring the first set of beamformed synchronization signals.

Figure 7:
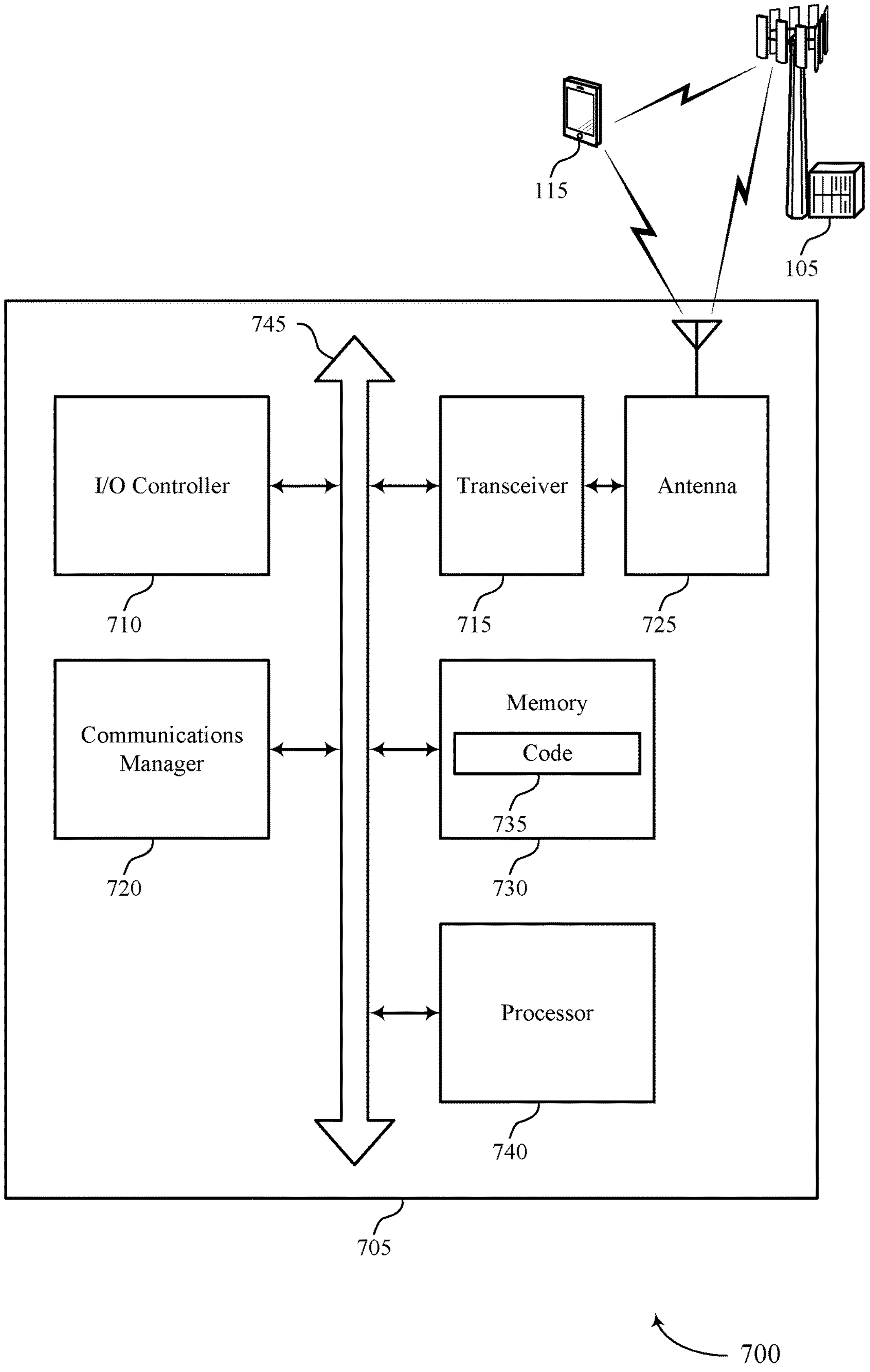
FIG. 7 shows a diagram of a system including a device that supports beamforming configuration of synchronization signals in accordance with one or more aspects of the present disclosure.

FIG. 7 shows a diagram of a system 700 including a device 705 that supports beamforming configuration of synchronization signals in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting beamforming configuration of synchronization signals). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for monitoring for a first set of beamformed synchronization signals including a first subset of synchronization information. The communications manager 720 is capable of, configured to, or operable to support a means for transmitting one or more beamformed wake-up signals based on the monitoring for the first set of beamformed synchronization signals. The communications manager 720 is capable of, configured to, or operable to support a means for monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

By including or configuring the communications manager 720 in accordance with examples as described herein, the device 705 may support techniques for reducing and/or balancing power consumption at the UE 115 and the network entity 105, as well as facilitate stronger beamforming and increased link budget.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of beamforming configuration of synchronization signals as described herein, or the at least one processor 740 and the at least one memory 730 may be otherwise configured to, individually or collectively, perform or support such operations.

Figure 8:
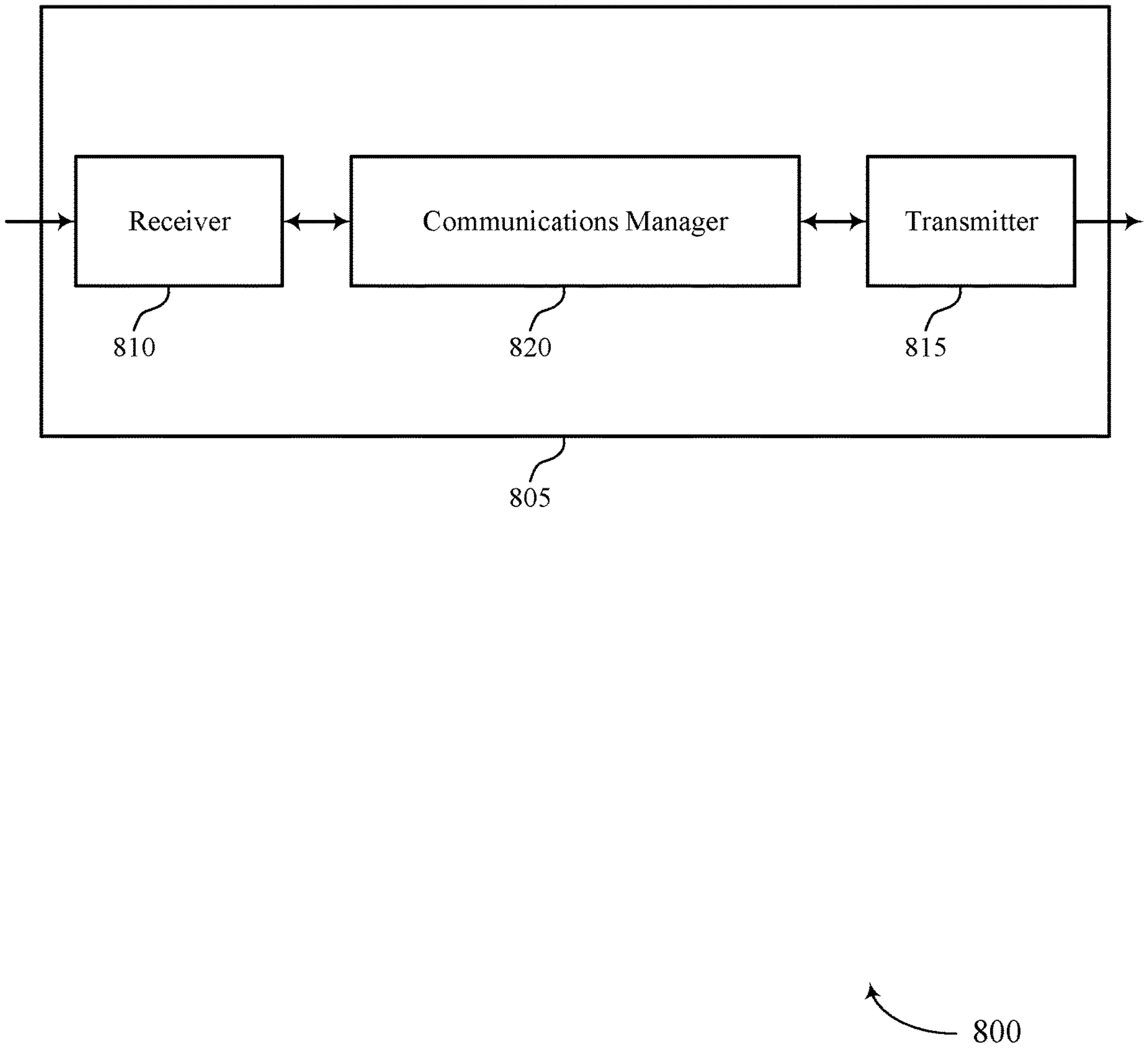
FIGS. 8 and 9 show block diagrams of devices that support beamforming configuration of synchronization signals in accordance with one or more aspects of the present disclosure.

FIG. 8 shows a block diagram 800 of a device 805 that supports beamforming configuration of synchronization signals in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of beamforming configuration of synchronization signals as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting a first set of beamformed synchronization signals including a first subset of synchronization information. The communications manager 820 is capable of, configured to, or operable to support a means for receiving one or more beamformed wake-up signals based on transmitting the first set of beamformed synchronization signals. The communications manager 820 is capable of, configured to, or operable to support a means for transmitting, in response to receiving the one or more beamformed wake-up signals, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reducing and/or balancing power consumption at the UE 115 and the network entity 105, as well as facilitate stronger beamforming and increased link budget.

Figure 9:
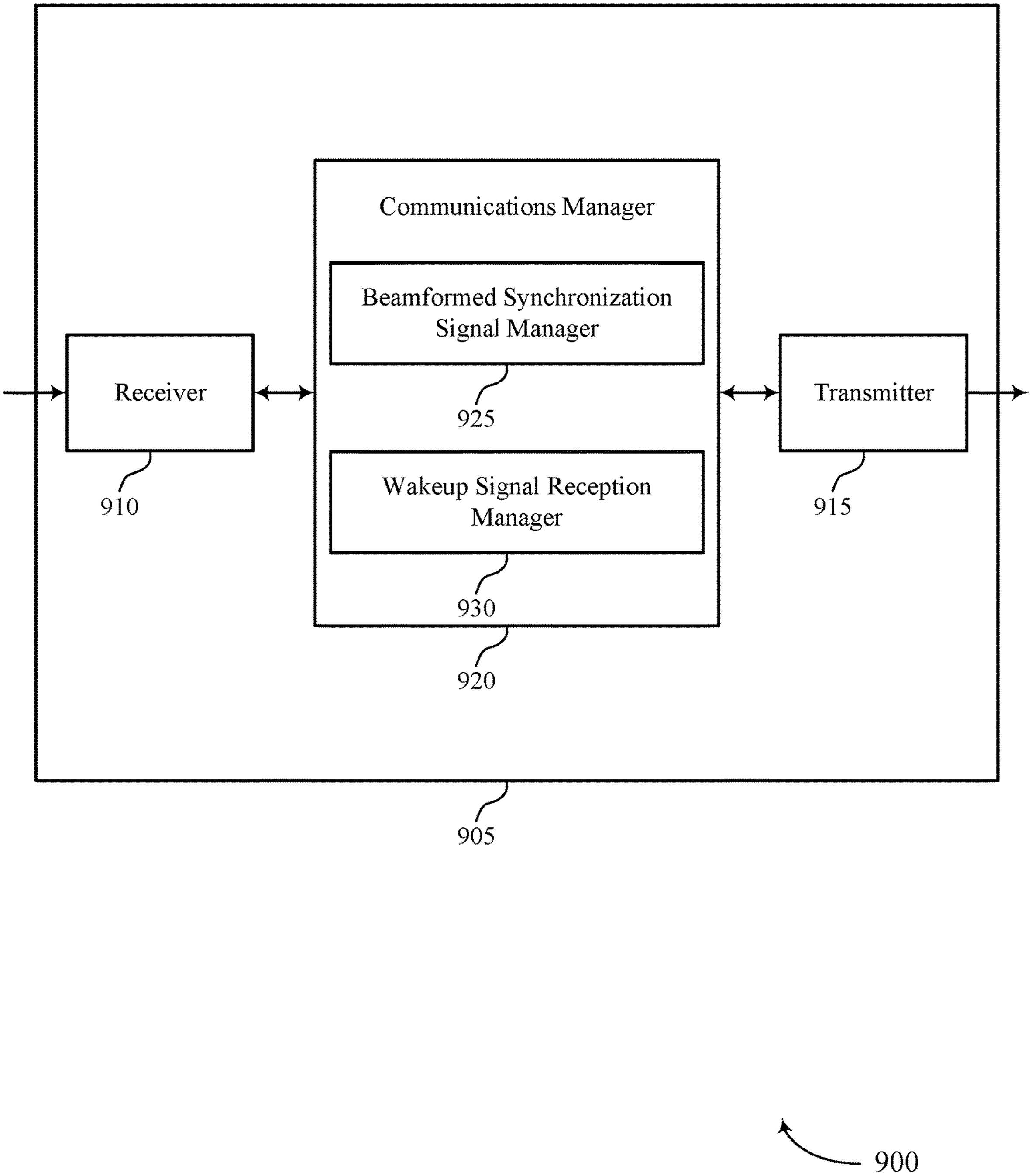

FIG. 9 shows a block diagram 900 of a device 905 that supports beamforming configuration of synchronization signals in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of beamforming configuration of synchronization signals as described herein. For example, the communications manager 920 may include a beamformed synchronization signal manager 925 a wake-up signal reception manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The beamformed synchronization signal manager 925 is capable of, configured to, or operable to support a means for transmitting a first set of beamformed synchronization signals including a first subset of synchronization information. The wake-up signal reception manager 930 is capable of, configured to, or operable to support a means for receiving one or more beamformed wake-up signals based on transmitting the first set of beamformed synchronization signals. The beamformed synchronization signal manager 925 is capable of, configured to, or operable to support a means for transmitting, in response to receiving the one or more beamformed wake-up signals, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

Figure 10:
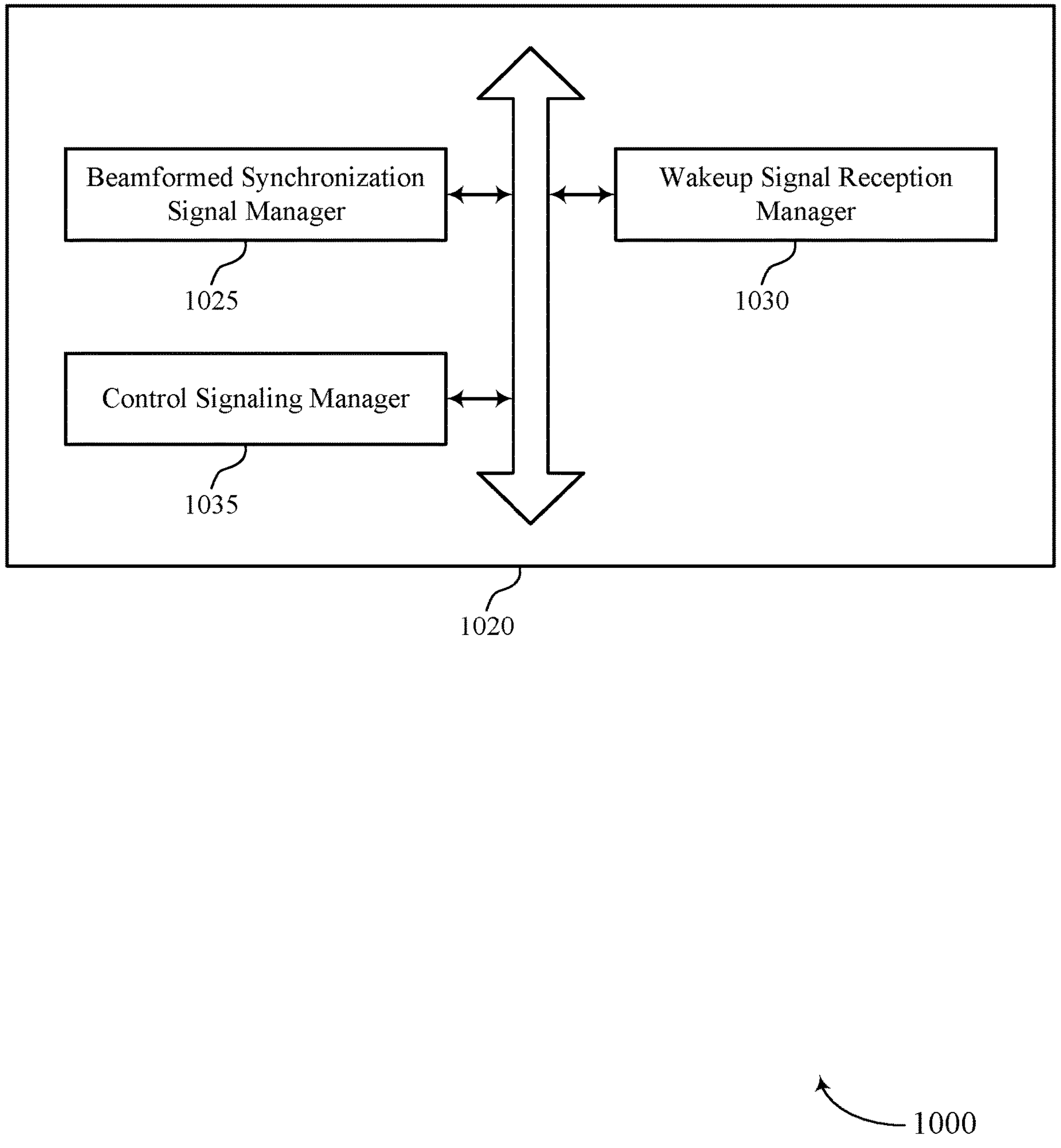
FIG. 10 shows a block diagram of a communications manager that supports beamforming configuration of synchronization signals in accordance with one or more aspects of the present disclosure.

FIG. 10 shows a block diagram 1000 of a communications manager 1020 that supports beamforming configuration of synchronization signals in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of beamforming configuration of synchronization signals as described herein. For example, the communications manager 1020 may include a beamformed synchronization signal manager 1025, a wake-up signal reception manager 1030, a control signaling manager 1035, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The beamformed synchronization signal manager 1025 is capable of, configured to, or operable to support a means for transmitting a first set of beamformed synchronization signals including a first subset of synchronization information. The wake-up signal reception manager 1030 is capable of, configured to, or operable to support a means for receiving one or more beamformed wake-up signals based on transmitting the first set of beamformed synchronization signals. In some examples, the beamformed synchronization signal manager 1025 is capable of, configured to, or operable to support a means for transmitting, in response to receiving the one or more beamformed wake-up signals, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

In some examples, a first beam width associated with transmitting the first set of beamformed synchronization signals is wider than a second beam width associated with transmitting the second set of beamformed synchronization signals.

In some examples, a same one or more directional beams are associated with transmitting the first set of beamformed synchronization signals and the second set of beamformed synchronization signals.

In some examples, transmitting the first set of beamformed synchronization signals or the second set of beamformed synchronization signals includes transmitting one or more repetitions of synchronization signals over a single transmit beam.

In some examples, a first beam width associated with transmitting the first set of beamformed synchronization signals is wider than a second beam width associated with receiving the one or more beamformed wake-up signals.

In some examples, the control signaling manager 1035 is capable of, configured to, or operable to support a means for transmitting control signaling that indicates. In some examples, the beamformed synchronization signal manager 1025 is capable of, configured to, or operable to support a means for a mapping between each of the beamformed synchronization signals of the first set of beamformed synchronization signals and the set of multiple beamformed synchronization signals of the second set of beamformed synchronization signals. In some examples, the beamformed synchronization signal manager 1025 is capable of, configured to, or operable to support a means for a mapping between each of the beamformed synchronization signals of the first set of beamformed synchronization signals and the one or more beamformed wake-up signals. In some examples, the beamformed synchronization signal manager 1025 is capable of, configured to, or operable to support a means for a mapping between the one or more beamformed wake-up signals and the set of multiple beamformed synchronization signals of the second set of beamformed synchronization signals. In some examples, the beamformed synchronization signal manager 1025 is capable of, configured to, or operable to support a means for a combination thereof.

In some examples, the control signaling includes a SI signal, an RRC signal, or a combination thereof.

In some examples, the control signaling manager 1035 is capable of, configured to, or operable to support a means for transmitting control signaling that indicates an RSRP threshold for transmitting a single beamformed wake-up signal or a set of multiple beamformed wake-up signals as the one or more beamformed wake-up signals.

In some examples, the wake-up signal reception manager 1030 is capable of, configured to, or operable to support a means for in response to an RSRP associated with one or more beamformed synchronization signals of the first set of beamformed synchronization signals being greater than the RSRP threshold, receiving the single beamformed wake-up signal as the one or more beamformed wake-up signals. In some examples, the wake-up signal reception manager 1030 is capable of, configured to, or operable to support a means for in response to the RSRP associated with one or more beamformed synchronization signals of the first set of beamformed synchronization signals being less than the RSRP threshold, receiving the set of multiple beamformed wake-up signals as the one or more beamformed wake-up signals.

In some examples, receiving the one or more beamformed wake-up signals is based on a selected wake-up signal sequence of a set of multiple wake-up signal sequences, the selected wake-up signal sequence based on a quantity of beamformed wake-up signals received as the one or more beamformed wake-up signals.

In some examples, the control signaling manager 1035 is capable of, configured to, or operable to support a means for transmitting control signaling that indicates additional information for a UE to monitor for the first set of beamformed synchronization signals, the additional information including a time window, a frequency location, one or more candidate beam directions, or any combination thereof.

In some examples, a quantity of directional beams associated with receiving the one or more beamformed wake-up signals is based on a UE capability, an RSRP associated with the first set of beamformed synchronization signals, the additional information, or any combination thereof.

In some examples, a first quantity of directional beams associated with receiving the one or more beamformed wake-up signals is greater than a second quantity of directional beams associated with transmitting the first set of beamformed synchronization signals.

Figure 11:
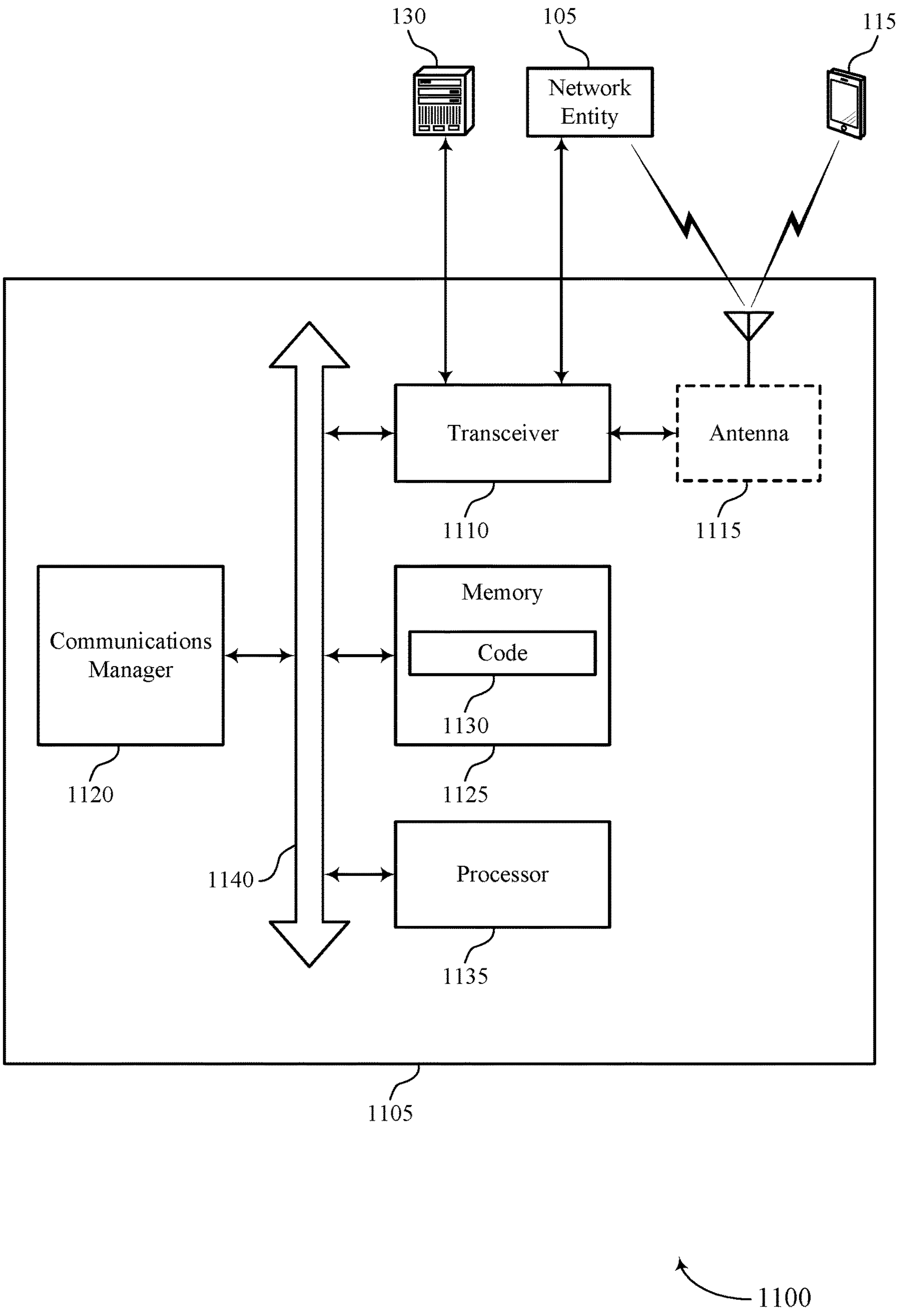
FIG. 11 shows a diagram of a system including a device that supports beamforming configuration of synchronization signals in accordance with one or more aspects of the present disclosure.

FIG. 11 shows a diagram of a system 1100 including a device 1105 that supports beamforming configuration of synchronization signals in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting beamforming configuration of synchronization signals). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting a first set of beamformed synchronization signals including a first subset of synchronization information. The communications manager 1120 is capable of, configured to, or operable to support a means for receiving one or more beamformed wake-up signals based on transmitting the first set of beamformed synchronization signals. The communications manager 1120 is capable of, configured to, or operable to support a means for transmitting, in response to receiving the one or more beamformed wake-up signals, a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals.

By including or configuring the communications manager 1120 in accordance with examples as described herein, the device 1105 may support techniques for reducing and/or balancing power consumption at the UE 115 and the network entity 105, as well as facilitate stronger beamforming and increased link budget.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of beamforming configuration of synchronization signals as described herein, or the at least one processor 1135 and the at least one memory 1125 may be otherwise configured to, individually or collectively, perform or support such operations.

Figure 12:
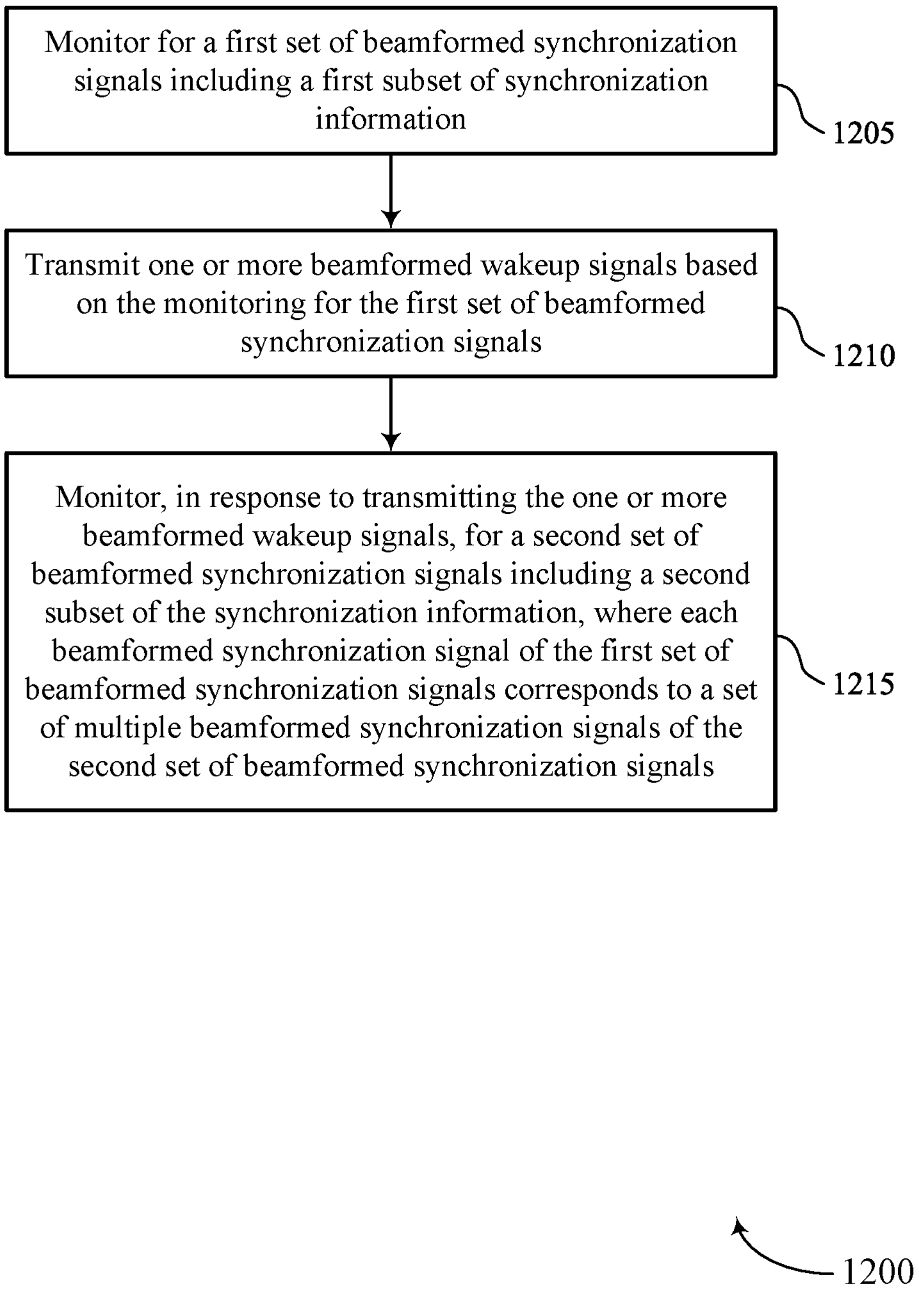
FIGS. 12 through 14 show flowcharts illustrating methods that support beamforming configuration of synchronization signals in accordance with one or more aspects of the present disclosure.

FIG. 12 shows a flowchart illustrating a method 1200 that supports beamforming configuration of synchronization signals in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include monitoring for a first set of beamformed synchronization signals including a first subset of synchronization information. The operations of block 1205 may be performed in accordance with examples as disclosed herein. In some examples, aspects of the operations of 1205 may be performed by a beamformed synchronization signal manager 625 as described with reference to FIG. 6.

At 1210, the method may include transmitting one or more beamformed wake-up signals based on the monitoring for the first set of beamformed synchronization signals. The operations of block 1210 may be performed in accordance with examples as disclosed herein. In some examples, aspects of the operations of 1210 may be performed by a wake-up signal transmission manager 630 as described with reference to FIG. 6.

At 1215, the method may include monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals. The operations of block 1215 may be performed in accordance with examples as disclosed herein. In some examples, aspects of the operations of 1215 may be performed by a beamformed synchronization signal manager 625 as described with reference to FIG. 6.

Figure 13:
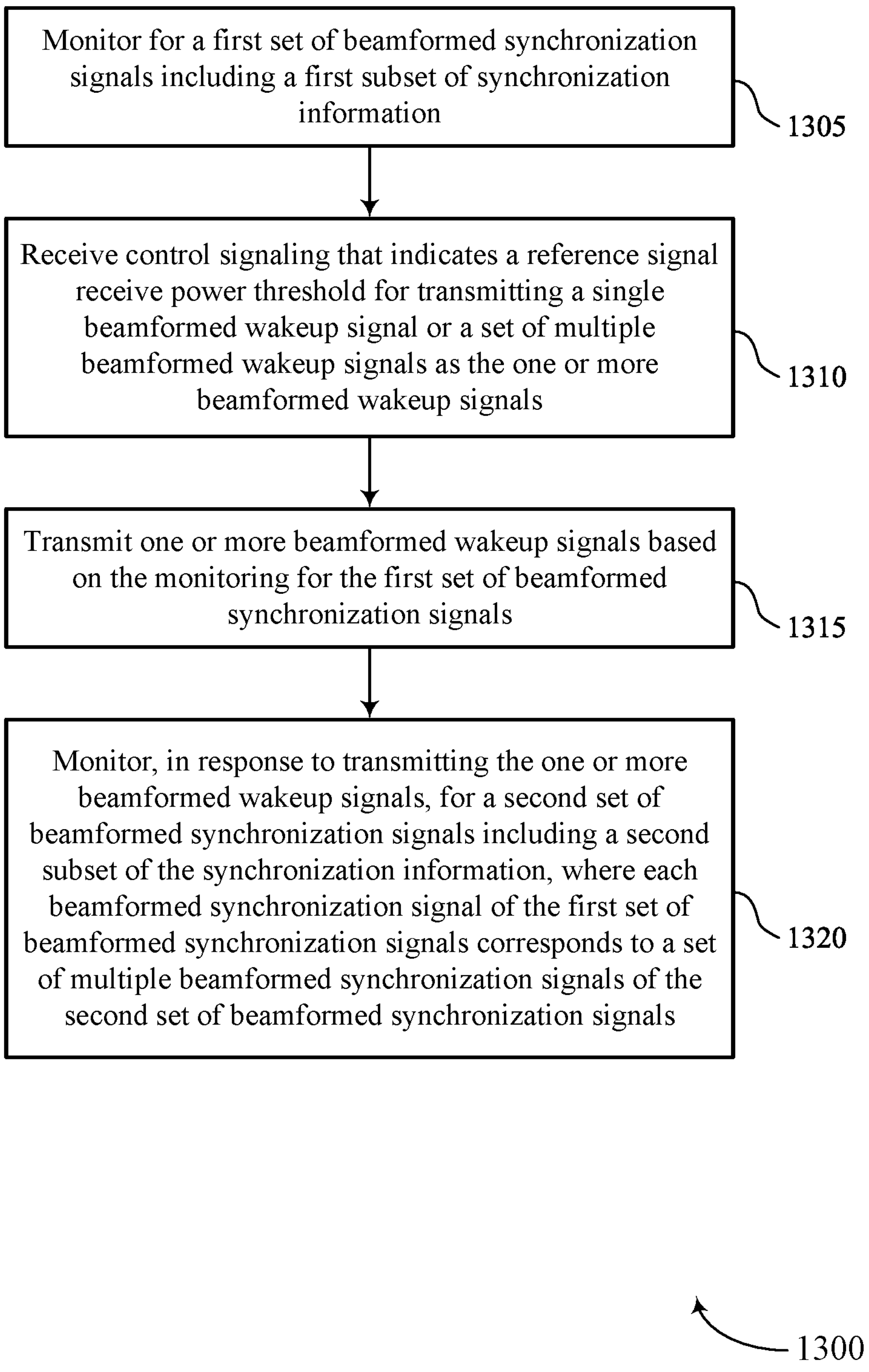

FIG. 13 shows a flowchart illustrating a method 1300 that supports beamforming configuration of synchronization signals in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include monitoring for a first set of beamformed synchronization signals including a first subset of synchronization information. The operations of block 1305 may be performed in accordance with examples as disclosed herein. In some examples, aspects of the operations of 1305 may be performed by a beamformed synchronization signal manager 625 as described with reference to FIG. 6.

At 1310, the method may include receiving control signaling that indicates an RSRP threshold for transmitting a single beamformed wake-up signal or a set of multiple beamformed wake-up signals as the one or more beamformed wake-up signals. The operations of block 1310 may be performed in accordance with examples as disclosed herein. In some examples, aspects of the operations of 1310 may be performed by a control signaling manager 635 as described with reference to FIG. 6.

At 1315, the method may include transmitting one or more beamformed wake-up signals based on the monitoring for the first set of beamformed synchronization signals. The operations of block 1315 may be performed in accordance with examples as disclosed herein. In some examples, aspects of the operations of 1315 may be performed by a wake-up signal transmission manager 630 as described with reference to FIG. 6.

At 1320, the method may include monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals. The operations of block 1320 may be performed in accordance with examples as disclosed herein. In some examples, aspects of the operations of 1320 may be performed by a beamformed synchronization signal manager 625 as described with reference to FIG. 6.

Figure 14:
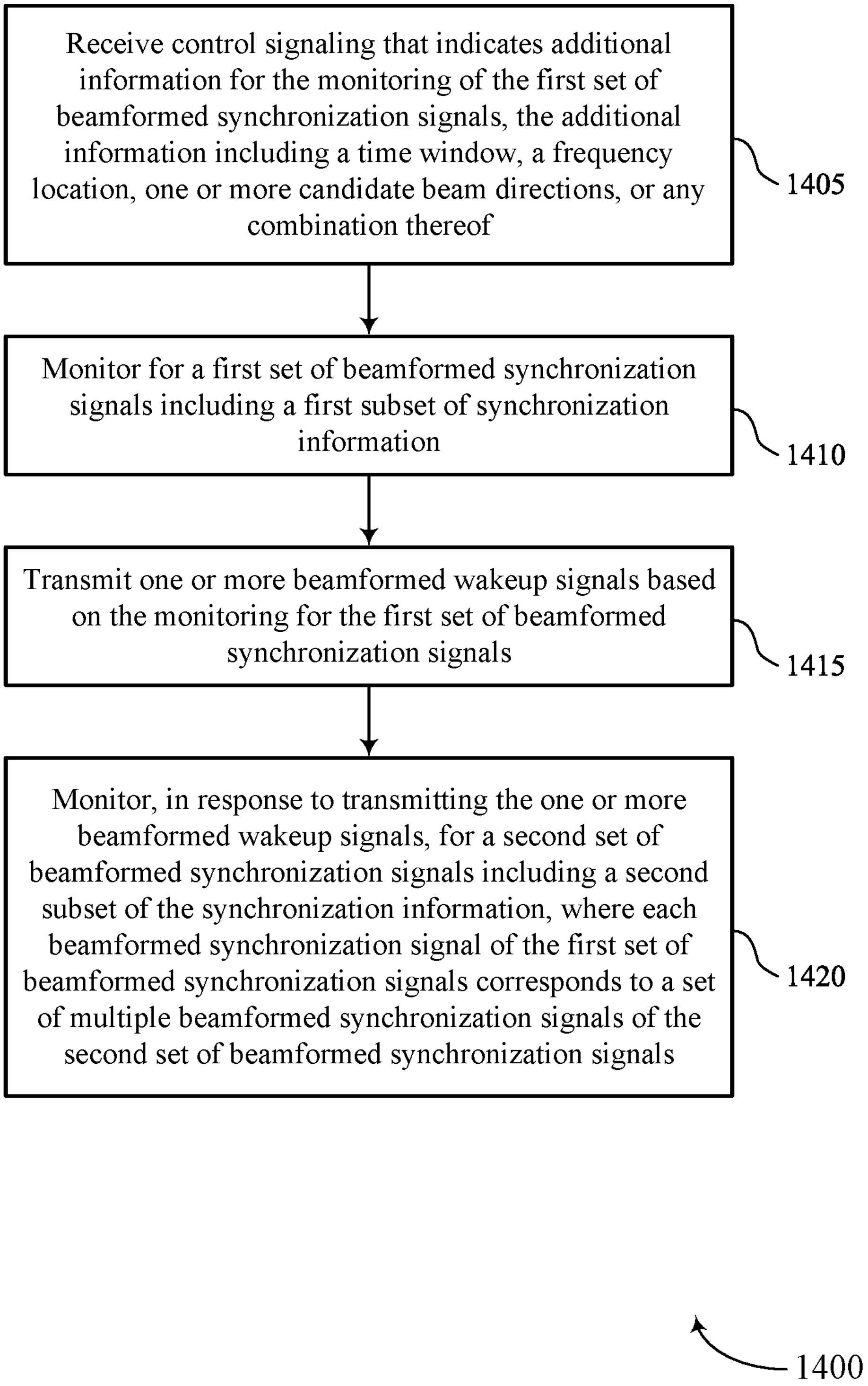

FIG. 14 shows a flowchart illustrating a method 1400 that supports beamforming configuration of synchronization signals in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates additional information for the monitoring of the first set of beamformed synchronization signals, the additional information including a time window, a frequency location, one or more candidate beam directions, or any combination thereof. The operations of block 1405 may be performed in accordance with examples as disclosed herein. In some examples, aspects of the operations of 1405 may be performed by a control signaling manager 635 as described with reference to FIG. 6.

At 1410, the method may include monitoring for a first set of beamformed synchronization signals including a first subset of synchronization information. The operations of block 1410 may be performed in accordance with examples as disclosed herein. In some examples, aspects of the operations of 1410 may be performed by a beamformed synchronization signal manager 625 as described with reference to FIG. 6.

At 1415, the method may include transmitting one or more beamformed wake-up signals based on the monitoring for the first set of beamformed synchronization signals. The operations of block 1415 may be performed in accordance with examples as disclosed herein. In some examples, aspects of the operations of 1415 may be performed by a wake-up signal transmission manager 630 as described with reference to FIG. 6.

At 1420, the method may include monitoring, in response to transmitting the one or more beamformed wake-up signals, for a second set of beamformed synchronization signals including a second subset of the synchronization information, where each beamformed synchronization signal of the first set of beamformed synchronization signals corresponds to a set of multiple beamformed synchronization signals of the second set of beamformed synchronization signals. The operations of block 1420 may be performed in accordance with examples as disclosed herein. In some examples, aspects of the operations of 1420 may be performed by a beamformed synchronization signal manager 625 as described with reference to FIG. 6. The following provides an overview of aspects of the present disclosure:

Aspect 1: A method for wireless communications at a UE, comprising: monitoring for a first set of beamformed synchronization signals comprising a first subset of synchronization information; transmitting one or more beamformed WUSs based at least in part on the monitoring for the first set of beamformed synchronization signals; and monitoring, in response to transmitting the one or more beamformed WUSs, for a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

Aspect 2: The method of aspect 1, further comprising: receiving control signaling that indicates: a mapping between each of the beamformed synchronization signals of the first set of beamformed synchronization signals and the plurality of beamformed synchronization signals of the second set of beamformed synchronization signals, a mapping between each of the beamformed synchronization signals of the first set of beamformed synchronization signals and the one or more beamformed WUSs, a mapping between the one or more beamformed WUSs and the plurality of beamformed synchronization signals of the second set of beamformed synchronization signals, or a combination thereof.

Aspect 3: The method of aspect 2, wherein the control signaling comprises a SI signal, a RRC signal, or a combination thereof.

Aspect 4: The method of any of aspects 1 through 3, further comprising: receiving control signaling that indicates a RSRP threshold for transmitting a single beamformed WUS or a plurality of beamformed WUSs as the one or more beamformed WUSs.

Aspect 5: The method of aspect 4, further comprising: in response to a RSRP associated with one or more beamformed synchronization signals of the first set of beamformed synchronization signals being greater than the RSRP threshold, transmitting the single beamformed WUS as the one or more beamformed WUSs; and in response to the RSRP associated with one or more beamformed synchronization signals of the first set of beamformed synchronization signals being less than the RSRP threshold, transmitting the plurality of beamformed WUSs as the one or more beamformed WUSs.

Aspect 6: The method of any of aspects 4 through 5, wherein transmitting the one or more beamformed WUSs is based at least in part on a selected WUS sequence of a plurality of WUS sequences, the selected WUS sequence based at least in part on a quantity of beamformed WUSs transmitted as the one or more beamformed WUSs.

Aspect 7: The method of any of aspects 1 through 6, further comprising: receiving control signaling that indicates additional information for the monitoring of the first set of beamformed synchronization signals, the additional information comprising a time window, a frequency location, one or more candidate beam directions, or any combination thereof.

Aspect 8: The method of aspect 7, wherein a quantity of directional beams associated with transmitting the one or more beamformed WUSs is based at least in part on a UE capability, a RSRP associated with the first set of beamformed synchronization signals, the additional information, or any combination thereof.

Aspect 9: The method of any of aspects 1 through 8, wherein a first quantity of directional transmission beams associated with transmitting the one or more beamformed WUSs is greater than a second quantity of directional receive beams associated with monitoring the first set of beamformed synchronization signals.

Aspect 10: A method for wireless communications at a network entity, comprising: transmitting a first set of beamformed synchronization signals comprising a first subset of synchronization information; receiving one or more beamformed WUSs based at least in part on transmitting the first set of beamformed synchronization signals; and transmitting, in response to receiving the one or more beamformed WUSs, a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

Aspect 11: The method of aspect 10, wherein a first beam width associated with transmitting the first set of beamformed synchronization signals is wider than a second beam width associated with transmitting the second set of beamformed synchronization signals.

Aspect 12: The method of any of aspects 10 through 11, wherein a same one or more directional beams are associated with transmitting the first set of beamformed synchronization signals and the second set of beamformed synchronization signals.

Aspect 13: The method of any of aspects 10 through 12, wherein transmitting the first set of beamformed synchronization signals or the second set of beamformed synchronization signals comprises transmitting one or more repetitions of synchronization signal blocks over a single transmission beam.

Aspect 14: The method of any of aspects 10 through 13, wherein a first beam width associated with transmitting the first set of beamformed synchronization signals is wider than a second beam width associated with receiving the one or more beamformed WUSs.

Aspect 15: The method of any of aspects 10 through 14, further comprising: transmitting control signaling that indicates: a mapping between each of the beamformed synchronization signals of the first set of beamformed synchronization signals and the plurality of beamformed synchronization signals of the second set of beamformed synchronization signals, a mapping between each of the beamformed synchronization signals of the first set of beamformed synchronization signals and the one or more beamformed WUSs, a mapping between the one or more beamformed WUSs and the plurality of beamformed synchronization signals of the second set of beamformed synchronization signals, or a combination thereof.

Aspect 16: The method of aspect 15, wherein the control signaling comprises a SI signal, a RRC signal, or a combination thereof.

Aspect 17: The method of any of aspects 10 through 16, further comprising: transmitting control signaling that indicates a RSRP threshold for transmitting a single beamformed WUS or a plurality of beamformed WUSs as the one or more beamformed WUSs.

Aspect 18: The method of aspect 17, further comprising: in response to a RSRP associated with one or more beamformed synchronization signals of the first set of beamformed synchronization signals being greater than the RSRP threshold, receiving the single beamformed WUS as the one or more beamformed WUSs; and in response to the RSRP associated with one or more beamformed synchronization signals of the first set of beamformed synchronization signals being less than the RSRP threshold, receiving the plurality of beamformed WUSs as the one or more beamformed WUSs.

Aspect 19: The method of any of aspects 10 through 18, wherein receiving the one or more beamformed WUSs is based at least in part on a selected WUS sequence of a plurality of WUS sequences, the selected WUS sequence based at least in part on a quantity of beamformed WUSs received as the one or more beamformed WUSs.

Aspect 20: The method of any of aspects 10 through 19, further comprising: transmitting control signaling that indicates additional information for a UE to monitor for the first set of beamformed synchronization signals, the additional information comprising a time window, a frequency location, one or more candidate beam directions, or any combination thereof.

Aspect 21: The method of aspect 20, wherein a quantity of directional beams associated with receiving the one or more beamformed WUSs is based at least in part on a UE capability, a RSRP associated with the first set of beamformed synchronization signals, the additional information, or any combination thereof.

Aspect 22: The method of any of aspects 10 through 21, wherein a first quantity of directional beams associated with receiving the one or more beamformed WUSs is greater than a second quantity of directional beams associated with transmitting the first set of beamformed synchronization signals.

Aspect 23: A UE for wireless communications, comprising one or more memories storing processor-executable code, and one or more processors coupled with the one or more memories and individually or collectively operable to execute the code to cause the UE to perform a method of any of aspects 1 through 9.

Aspect 24: A UE for wireless communications, comprising at least one means for performing a method of any of aspects 1 through 9.

Aspect 25: A non-transitory computer-readable medium storing code for wireless communications, the code comprising instructions executable by a processor to perform a method of any of aspects 1 through 9.

Aspect 26: A network entity for wireless communications, comprising one or more memories storing processor-executable code, and one or more processors coupled with the one or more memories and individually or collectively operable to execute the code to cause the network entity to perform a method of any of aspects 10 through 22.

Aspect 27: A network entity for wireless communications, comprising at least one means for performing a method of any of aspects 10 through 22.

Aspect 28: A non-transitory computer-readable medium storing code for wireless communications, the code comprising instructions executable by a processor to perform a method of any of aspects 10 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - monitor for a first set of beamformed synchronization signals comprising a first subset of synchronization information;
  - transmit one or more beamformed wake-up signals based at least in part on the monitoring for the first set of beamformed synchronization signals; and
  - monitor, in response to transmitting the one or more beamformed wake-up signals, for a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

2. The UE of claim 1, wherein the one or more processors are individually or collectively further operable to execute the code to cause the UE to:
- receive control signaling that indicates:
  - a mapping between each beamformed synchronization signal of the first set of beamformed synchronization signals and the plurality of beamformed synchronization signals of the second set of beamformed synchronization signals,
  - a mapping between each beamformed synchronization signal of the first set of beamformed synchronization signals and the one or more beamformed wake-up signals,
  - a mapping between the one or more beamformed wake-up signals and the plurality of beamformed synchronization signals of the second set of beamformed synchronization signals, or
  - a combination thereof.

3. The UE of claim 2, wherein the control signaling comprises a system information signal, a radio resource control signal, or a combination thereof.

4. The UE of claim 1, wherein the one or more processors are individually or collectively further operable to execute the code to cause the UE to:
- receive control signaling that indicates a reference signal receive power threshold for transmitting a single beamformed wake-up signal or a plurality of beamformed wake-up signals as the one or more beamformed wake-up signals.

5. The UE of claim 4, wherein the one or more processors are individually or collectively further operable to execute the code to cause the UE to:
- in response to a reference signal receive power associated with one or more beamformed synchronization signals of the first set of beamformed synchronization signals being greater than the reference signal receive power threshold, transmitting the single beamformed wake-up signal as the one or more beamformed wake-up signals; and
- in response to the reference signal receive power associated with one or more beamformed synchronization signals of the first set of beamformed synchronization signals being less than the reference signal receive power threshold, transmitting the plurality of beamformed wake-up signals as the one or more beamformed wake-up signals.

6. The UE of claim 4, wherein transmitting the one or more beamformed wake-up signals is based at least in part on a selected wake-up signal sequence of a plurality of wake-up signal sequences, the selected wake-up signal sequence based at least in part on a quantity of beamformed wake-up signals transmitted as the one or more beamformed wake-up signals.

7. The UE of claim 1, wherein the one or more processors are individually or collectively further operable to execute the code to cause the UE to:
- receive control signaling that indicates additional information for the monitoring of the first set of beamformed synchronization signals, the additional information comprising a time window, a frequency location, one or more candidate beam directions, or any combination thereof.

8. The UE of claim 7, wherein a quantity of directional beams associated with transmitting the one or more beamformed wake-up signals is based at least in part on a UE capability, a reference signal receive power associated with the first set of beamformed synchronization signals, the additional information, or any combination thereof.

9. The UE of claim 1, wherein a first quantity of directional transmission beams associated with transmitting the one or more beamformed wake-up signals is greater than a second quantity of directional receive beams associated with monitoring the first set of beamformed synchronization signals.

10. A network entity, comprising:
- one or more memories storing processor-executable code; and
- one or more processors coupled with the one or more memories and individually or collectively operable to execute the code to cause the network entity to:
  - transmit a first set of beamformed synchronization signals comprising a first subset of synchronization information;

receive one or more beamformed wake-up signals based at least in part on transmitting the first set of beamformed synchronization signals; and transmit, in response to receiving the one or more beamformed wake-up signals, a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

11. The network entity of claim 10, wherein a first beam width associated with transmitting the first set of beamformed synchronization signals is wider than a second beam width associated with transmitting the second set of beamformed synchronization signals.

12. The network entity of claim 10, wherein a same one or more directional beams are associated with transmitting the first set of beamformed synchronization signals and the second set of beamformed synchronization signals.

13. The network entity of claim 10, wherein transmitting the first set of beamformed synchronization signals or the second set of beamformed synchronization signals comprises transmitting one or more repetitions of synchronization signal blocks over a single transmission beam.

14. The network entity of claim 10, wherein a first beam width associated with transmitting the first set of beamformed synchronization signals is wider than a second beam width associated with receiving the one or more beamformed wake-up signals.

15. The network entity of claim 10, wherein the one or more processors are individually or collectively further operable to execute the code to cause the network entity to:

transmit control signaling that indicates:

a mapping between each beamformed synchronization signal of the first set of beamformed synchronization signals and the plurality of beamformed synchronization signals of the second set of beamformed synchronization signals, mapping between each beamformed synchronization signal of the first set of beamformed synchronization signals and the one or more beamformed wake-up signals, a mapping between the one or more beamformed wake-up signals and the plurality of beamformed synchronization signals of the second set of beamformed synchronization signals, or a combination thereof.

16. The network entity of claim 15, wherein the control signaling comprises a system information signal, a radio resource control signal, or a combination thereof.

17. The network entity of claim 10, wherein the one or more processors are individually or collectively further operable to execute the code to cause the network entity to:

transmit control signaling that indicates a reference signal receive power threshold for transmitting a single beamformed wake-up signal or a plurality of beamformed wake-up signals as the one or more beamformed wake-up signals.

18. The network entity of claim 17, wherein the one or more processors are individually or collectively further operable to execute the code to cause the network entity to:

in response to a reference signal receive power associated with one or more beamformed synchronization signals of the first set of beamformed synchronization signals being greater than the reference signal receive power threshold, receiving the single beamformed wake-up signal as the one or more beamformed wake-up signals; and in response to the reference signal receive power associated with one or more beamformed synchronization signals of the first set of beamformed synchronization signals being less than the reference signal receive power threshold, receiving the plurality of beamformed wake-up signals as the one or more beamformed wake-up signals.

19. The network entity of claim 10, wherein receiving the one or more beamformed wake-up signals is based at least in part on a selected wake-up signal sequence of a plurality of wake-up signal sequences, the selected wake-up signal sequence based at least in part on a quantity of beamformed wake-up signals received as the one or more beamformed wake-up signals.

20. The network entity of claim 10, wherein the one or more processors are individually or collectively further operable to execute the code to cause the network entity to:

transmit control signaling that indicates additional information for a user equipment (UE) to monitor for the first set of beamformed synchronization signals, the additional information comprising a time window, a frequency location, one or more candidate beam directions, or any combination thereof.

21. The network entity of claim 20, wherein a quantity of directional beams associated with receiving the one or more beamformed wake-up signals is based at least in part on a UE capability, a reference signal receive power associated with the first set of beamformed synchronization signals, the additional information, or any combination thereof.

22. The network entity of claim 10, wherein a first quantity of directional beams associated with receiving the one or more beamformed wake-up signals is greater than a second quantity of directional beams associated with transmitting the first set of beamformed synchronization signals.

23. A method for wireless communications at a user equipment (UE), comprising:

monitoring for a first set of beamformed synchronization signals comprising a first subset of synchronization information;

transmitting one or more beamformed wake-up signals based at least in part on the monitoring for the first set of beamformed synchronization signals; and monitoring, in response to transmitting the one or more beamformed wake-up signals, for a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

24. The method of claim 23, further comprising:

receiving control signaling that indicates:

a mapping between each beamformed synchronization signal of the first set of beamformed synchronization signals and the plurality of beamformed synchronization signals of the second set of beamformed synchronization signals, a mapping between each beamformed synchronization signal of the first set of beamformed synchronization signals and the one or more beamformed wake-up signals, a mapping between the one or more beamformed wake-up signals and the plurality of beamformed synchronization signals of the second set of beamformed synchronization signals, or a combination thereof.

25. The method of claim 24, wherein the control signaling comprises a system information signal, a radio resource control signal, or a combination thereof.

26. The method of claim 23, further comprising:

receiving control signaling that indicates a reference signal receive power threshold for transmitting a single beamformed wake-up signal or a plurality of beamformed wake-up signals as the one or more beamformed wake-up signals.

27. A method for wireless communications at a network entity, comprising:

transmitting a first set of beamformed synchronization signals comprising a first subset of synchronization information;

receiving one or more beamformed wake-up signals based at least in part on transmitting the first set of beamformed synchronization signals; and transmitting, in response to receiving the one or more beamformed wake-up signals, a second set of beamformed synchronization signals comprising a second subset of the synchronization information, wherein each beamformed synchronization signal of the first set of beamformed synchronization signals corresponds to a plurality of beamformed synchronization signals of the second set of beamformed synchronization signals.

28. The method of claim 27, wherein a first beam width associated with transmitting the first set of beamformed synchronization signals is wider than a second beam width associated with receiving the one or more beamformed wake-up signals.

29. The method of claim 27, further comprising:

transmitting control signaling that indicates:

a mapping between each beamformed synchronization signal of the first set of beamformed synchronization signals and the plurality of beamformed synchronization signals of the second set of beamformed synchronization signals, a mapping between each beamformed synchronization signal of the first set of beamformed synchronization signals and the one or more beamformed wake-up signals, a mapping between the one or more beamformed wake-up signals and the plurality of beamformed synchronization signals of the second set of beamformed synchronization signals, or a combination thereof.

30. The method of claim 29, wherein the control signaling comprises a system information signal, a radio resource control signal, or a combination thereof.

* * * * *